US012482401B2

(12) United States Patent
Ohara

(10) Patent No.: US 12,482,401 B2

(45) Date of Patent: Nov. 25, 2025

(54) DISPLAY DEVICE

(71) Applicant: JOLED INC., Tokyo (JP)

(72) Inventor: Masanori Ohara, Tokyo (JP)

(73) Assignee: MAGNOLIA BLUE CORPORATION, Tokyo (JP)

( * ) Notice: Subject to any disclaimer, the term of this patent is extended or adjusted under 35 U.S.C. 154(b) by 422 days.

(21) Appl. No.: 17/900,000

(22) Filed: Aug. 31, 2022

(65) Prior Publication Data

US 2023/0077438 A1 Mar. 16, 2023

(30) Foreign Application Priority Data

Sep. 13, 2021 (JP) ................................ 2021-148848

(51) Int. Cl.
*G09G 3/20* (2006.01)
*G09G 3/3233* (2016.01)
(Continued)

(52) U.S. Cl.
CPC ......... *G09G 3/2096* (2013.01); *G09G 3/3233* (2013.01); *G09G 3/3266* (2013.01);
(Continued)

(58) Field of Classification Search
CPC .. G09G 3/2096; G09G 3/3233; G09G 3/3266; G09G 3/3291; G09G 2300/0819; G09G 2300/0842; G09G 2300/0861; G09G 2310/0251; G09G 2310/0286; G09G 2310/061; G09G 2310/0297; G09G 2320/0219; G09G 2320/0233; G09G 2320/043; G09G 2330/021; G09G 3/3275; G09G 2300/0426; G09G 2320/0223
See application file for complete search history.

(56) References Cited

U.S. PATENT DOCUMENTS

2002/0080109 A1* 6/2002 Nagata ................ G09G 3/3648
257/E27.111
2009/0079727 A1 3/2009 Ozawa
(Continued)

FOREIGN PATENT DOCUMENTS

| | | |
|---|---|---|
| JP | 2009-080252 | 4/2009 |
| JP | 2012-208389 | 10/2012 |
| WO | 2017/010286 | 1/2017 |

*Primary Examiner* — Amr A Awad
*Assistant Examiner* — Aaron Midkiff
(74) *Attorney, Agent, or Firm* — Greenblum & Bernstein, P.L.C.

(57) ABSTRACT

A display device includes: a plurality of pixels; a plurality of write signal lines to which a control signal for selecting a pixel row in which a data voltage is to be written is supplied; a WS signal gate driver that supplies the control signal; a plurality of data voltage lines for writing a data voltage; a data driver that supplies the data voltage; a selector circuit that switches a data voltage line to which the data voltage is supplied; a selector control line to which a control signal for controlling the selector circuit is supplied; and a controller that supplies the control signal. The plurality of pixels include a first pixel and a second pixel belonging to a same pixel row. The WS signal gate driver supplies the control signal in a first direction. The controller supplies the control signal in a second direction opposite to the first direction.

7 Claims, 11 Drawing Sheets

(51) Int. Cl.
*G09G 3/3266* (2016.01)
*G09G 3/3291* (2016.01)

(52) U.S. Cl.
CPC ... *G09G 3/3291* (2013.01); *G09G 2300/0819* (2013.01); *G09G 2300/0842* (2013.01); *G09G 2310/0286* (2013.01); *G09G 2320/0233* (2013.01); *G09G 2330/021* (2013.01)

(56) References Cited

U.S. PATENT DOCUMENTS

| | | | | |
|---|---|---|---|---|
| 2012/0249616 | A1 | 10/2012 | Komatsu et al. | |
| 2016/0322008 | A1* | 11/2016 | Sang | G09G 3/3688 |
| 2018/0174507 | A1 | 6/2018 | Ohara et al. | |
| 2020/0273408 | A1* | 8/2020 | Kim | H10K 59/131 |
| 2022/0208874 | A1* | 6/2022 | Zhang | H10K 59/121 |
| 2023/0024029 | A1* | 1/2023 | Yu | G09G 3/3291 |

* cited by examiner

FIG. 6A

ΔVfs by WS waveform rounding

| ΔVfs | Magnitude of ΔVfs |
|---|---|
| ΔVfs_vg1 (position: left) | Large (inclination: steep) |
| ΔVfs_vg2 (position: center) | Medium (inclination: intermediate) |
| ΔVfs_vg3 (position: right) | Large (inclination: steep) |

FIG. 6B

ΔVfs by SEL waveform rounding

| ΔVfs | Magnitude of ΔVfs |
|---|---|
| ΔVfs_vg1 (position: left) | Large (inclination: steep) |
| ΔVfs_vg2 (position: center) | Medium (inclination: intermediate) |
| ΔVfs_vg3 (position: right) | Large (inclination: steep) |

FIG. 6C

Total ΔVfs by waveform rounding

| In-plane position | Magnitude of ΔVfs |
|---|---|
| Left | Large (inclination: steep + steep) |
| Center | Medium (inclination: intermediate + intermediate) |
| Right | Large (inclination: steep + steep) |

FIG. 8A

ΔVfs by WS waveform rounding

| ΔVfs | Magnitude of ΔVfs |
|---|---|
| ΔVfs_vg11 (position: left) | Large (inclination: steep) |
| ΔVfs_vg12 (position: center) | Medium (inclination: intermediate) |
| ΔVfs_vg13 (position: right) | Small (inclination: gentle) |

FIG. 8B

ΔVfs by SEL waveform rounding

| ΔVfs | Magnitude of ΔVfs |
|---|---|
| ΔVfs_vg11 (position: left) | Small (inclination: gentle) |
| ΔVfs_vg12 (position: center) | Medium (inclination: intermediate) |
| ΔVfs_vg13 (position: right) | Large (inclination: steep) |

FIG. 8C

Total ΔVfs by waveform rounding

| In-plane position | Magnitude of ΔVfs |
|---|---|
| Left | Medium (inclination: steep + gentle) |
| Center | Medium (inclination: intermediate + intermediate) |
| Right | Medium (inclination: gentle + steep) |

DISPLAY DEVICE

CROSS REFERENCE TO RELATED APPLICATION

The present application is based on and claims priority of Japanese Patent Application No. 2021-148848 filed on Sep. 13, 2021. The entire disclosure of the above-identified application, including the specification, drawings and claims is incorporated herein by reference in its entirety.

FIELD

The present disclosure relates to a display device.

BACKGROUND

Display devices including a data selector circuit that inputs data voltages corresponding to gradation values output from a data circuit (data driver) to signal lines in a time division manner via a plurality of switches (for example, RGB switches) are conventionally known. Patent Literature (PTL) 1 discloses a display device including such a data selector circuit and a pair of gate circuits (gate drivers) that are located at both ends of gate lines and output gate signals.

CITATION LIST

Patent Literature

PTL 1: Japanese Unexamined Patent Application Publication No. 2012-208389

SUMMARY

Technical Problem

In the display device disclosed in PTL 1, there is a possibility that luminance is not uniform in a plane. For example, a feedthrough voltage resulting from turnoff of a switch of a data selector circuit or a write transistor of a pixel can cause non-uniform in-plane luminance.

In view of this, the present disclosure provides a display device capable of preventing non-uniformity of in-plane luminance caused by feedthrough voltage.

Solution to Problem

A display device according to an aspect of the present disclosure includes: a plurality of pixels arranged in a matrix; a plurality of first gate control lines that are each located at a different pixel row in the plurality of pixels, and to which a first gate control signal is supplied, the first gate control signal being for selecting a pixel row to which a data voltage corresponding to image data is to be written; a first gate driver that supplies the first gate control signal to the plurality of first gate control lines; a plurality of data voltage lines that are each located at a different pixel column in the plurality of pixels, and used to write the data voltage corresponding to the image data; a data driver that supplies the data voltage to the plurality of data voltage lines; a selector circuit that is connected between the data driver and the plurality of data voltage lines, and switches a data voltage line to which the data voltage from the data driver is supplied among the plurality of data voltage lines; a first selector control line to which a selector control signal for controlling the selector circuit is supplied; and a controller that supplies the selector control signal to the first selector control line, wherein the plurality of pixels include a first pixel and a second pixel that belong to a same pixel row, the first gate driver supplies the first gate control signal to the plurality of first gate control lines to transfer the first gate control signal in a first direction from the first pixel to the second pixel, and the controller supplies the selector control signal to the first selector control line to transfer the selector control signal in a second direction from the second pixel to the first pixel.

Advantageous Effects

A display device according to an aspect of the present disclosure is capable of preventing non-uniformity of in-plane luminance caused by feedthrough voltage.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6A is a diagram illustrating the magnitude of feedthrough voltage at each pixel position in the display device according to the comparative example.

FIG. 6B is a diagram illustrating the magnitude of feedthrough voltage at each switch position in the display device according to the comparative example.

FIG. 6C is a diagram illustrating the magnitude of feedthrough voltage at each in-plane position in the display device according to the comparative example.

FIG. 8A is a diagram illustrating the magnitude of feedthrough voltage at each pixel position in the display device according to Embodiment 1.

FIG. 8B is a diagram illustrating the magnitude of feedthrough voltage at each switch position in the display device according to Embodiment 1.

FIG. 8C is a diagram illustrating the magnitude of feedthrough voltage at each in-plane position in the display device according to Embodiment 1.

DESCRIPTION OF EMBODIMENTS

Embodiments of the present disclosure will be described below, with reference to the drawings. The embodiments described below each show a specific example according to the present disclosure. The numerical values, shapes, materials, structural elements, the arrangement and connection of the structural elements, etc. shown in the following embodiments are mere examples, and do not limit the scope of the present disclosure. Of the structural elements in the embodiments described below, the structural elements not recited in any one of the independent claims in the present disclosure are described as optional structural elements.

Each drawing is a schematic and does not necessarily provide precise depiction. The substantially same structural elements are given the same reference signs throughout the drawings, and repeated description is omitted or simplified.

In the specification, the terms indicating the relationships between elements, such as "orthogonal", "parallel", and "equal", the numerical values, and the numerical ranges are not expressions of strict meanings only, but are expressions of meanings including substantially equivalent ranges, for example, allowing for a difference of about several percent (e.g. about 10%).

Embodiment 1

[1-1. Structure of Display Device]

Figure 1:
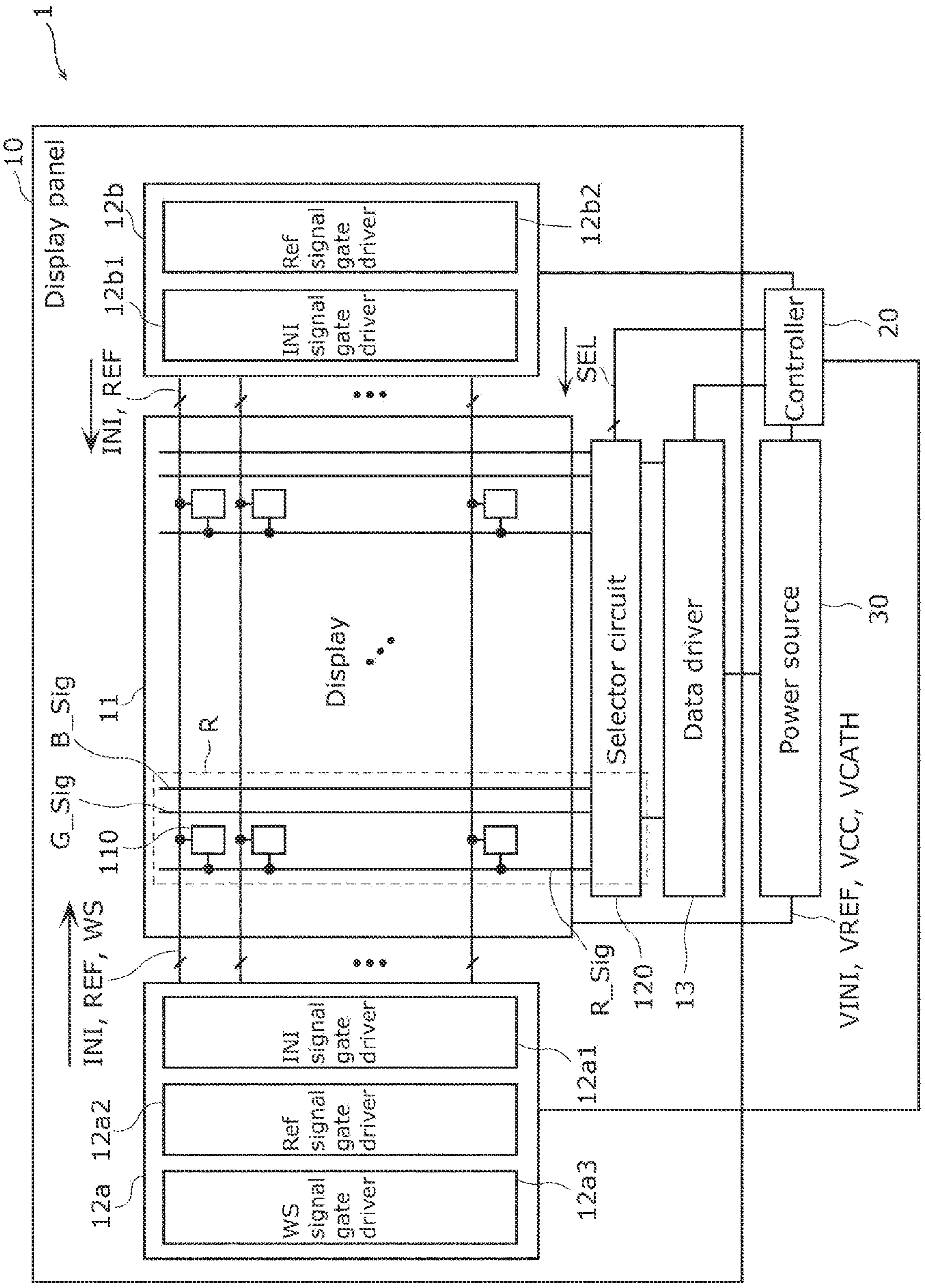
FIG. 1 is a block diagram illustrating an example of the functional structure of a display device according to Embodiment 1.
Figure 2:
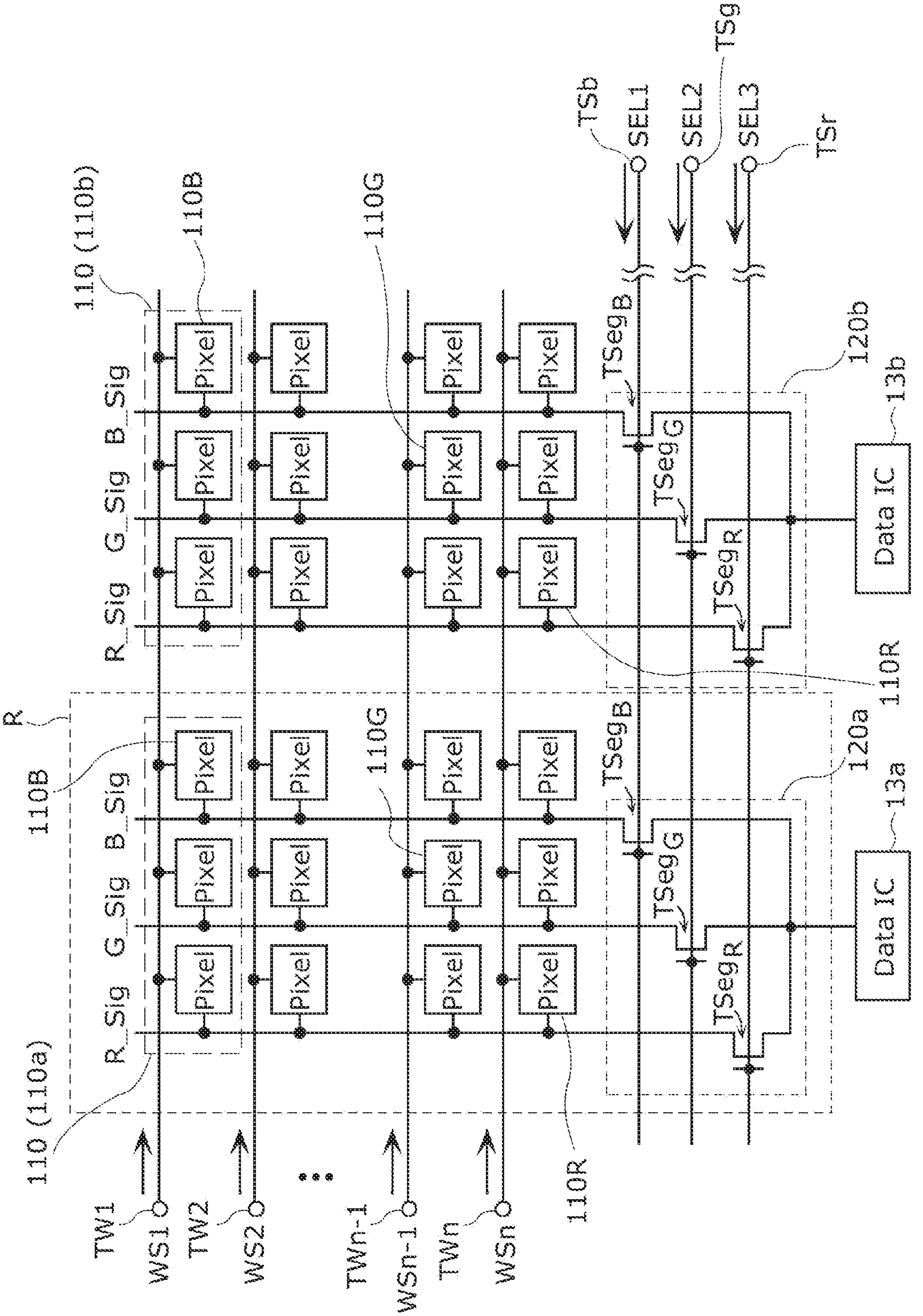
FIG. 2 is an enlarged diagram of a region including a dashed line region in FIG. 1.

The structure of a display device according to this embodiment will be described below, with reference to FIG. 1 to FIG. 3. FIG. 1 is a block diagram illustrating an example of the functional structure of display device 1 according to this embodiment. FIG. 2 is an enlarged diagram of a region including dashed line region R in FIG. 1. Dashed line region R represents the structure of one pixel column. The structure of two pixel columns adjacent to each other is illustrated in FIG. 2.

In FIG. 2, pixel 110 in dashed line region R is first pixel 110*a*, and pixel 110 connected to the same write signal line WS (for example, write signal line WS1) as first pixel 110*a* and arranged side by side with first pixel 110*a* is second pixel 110*b*. First pixel 110*a* and second pixel 110*b* are pixels 110 belonging to the same pixel row, and are, for example, adjacent to each other. In FIG. 2, each subpixel is indicated as "pixel" for convenience's sake.

In the following description, a signal and wiring for transmitting the signal are given the same reference sign in some cases for simplicity's sake.

As illustrated in FIG. 1, display device 1 includes display panel 10, controller 20, and power source 30. Display panel 10 includes display 11, first gate driver 12*a*, second gate driver 12*b*, data driver 13, and selector circuit (data selector circuit) 120. Only pixels 110 (corresponding to subpixels 110R illustrated in FIG. 2) connected to data voltage line R_Sig from among data voltage lines B_Sig, G_Sig, and R_Sig are illustrated in FIG. 1.

Figure 3:
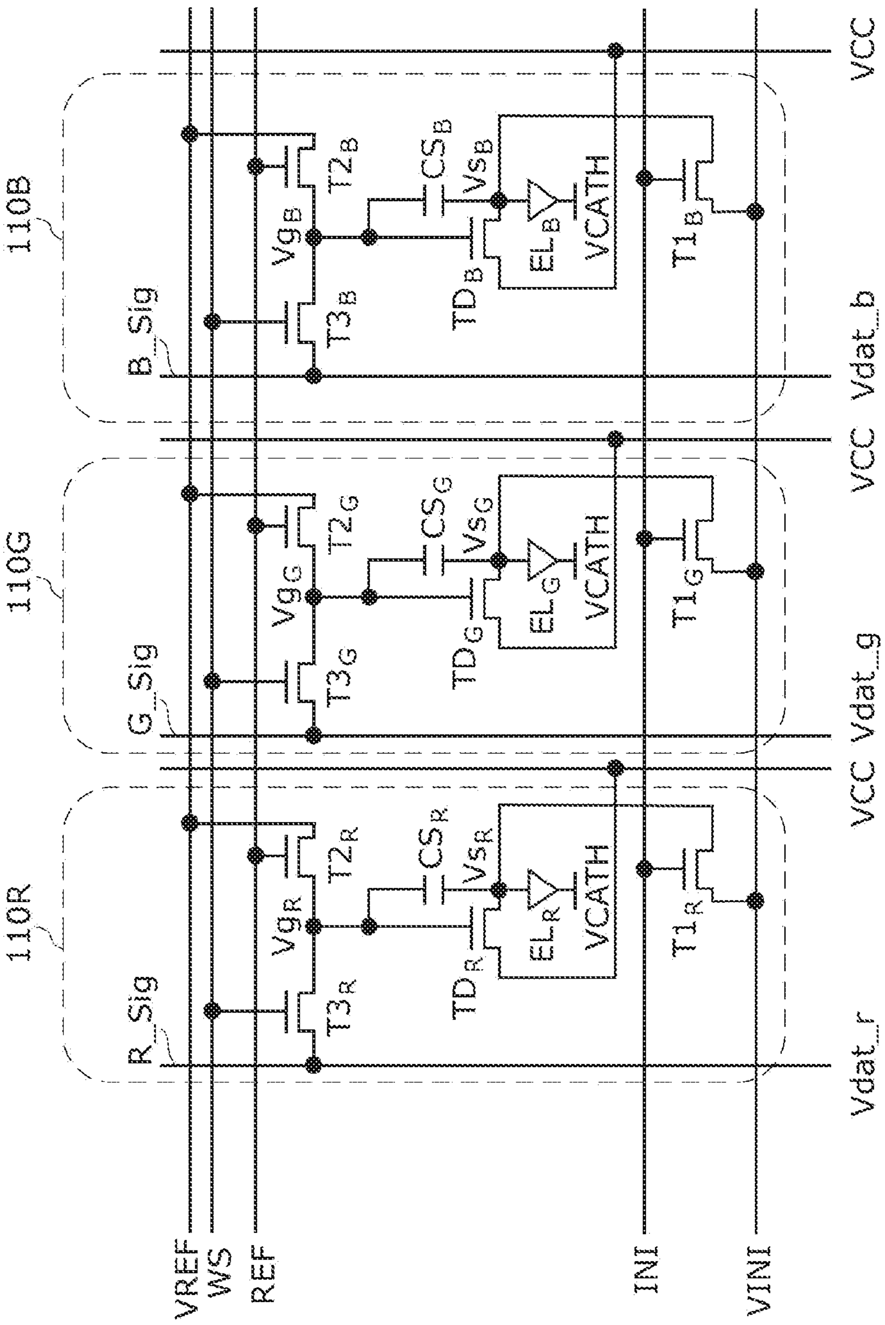
FIG. 3 is a circuit diagram illustrating an example of the structure of a pixel circuit in the display device according to Embodiment 1.

Display 11 includes a plurality of pixels 110 that are arranged in a matrix and each include light-emitting elements $EL_B$, $EL_G$, and $EL_R$ (see FIG. 3). The plurality of pixels 110 include the foregoing first pixel 110*a* and second pixel 110*b*. In each row of the matrix, a control signal line (gate control line) commonly connected to a plurality of pixels 110 arranged in the row is provided. In each column of the matrix, data voltage lines B_Sig, G_Sig, and R_Sig (hereafter also referred to as "data voltage line B_Sig, etc.") commonly connected to a plurality of pixels 110 arranged in the column are provided.

Data voltage line B_Sig is connected to each subpixel 110B belonging to a pixel column including one or more subpixels 110B (see FIG. 2), and has a function of supplying data voltage Vdat_b (see FIG. 3) to each subpixel 110B. Each subpixel 110B is, for example, a blue light-emitting subpixel. These subpixels 110B constitute one subpixel column.

Data voltage line G_Sig is connected to each subpixel 110G belonging to a pixel column including one or more subpixels 110G (see FIG. 2), and has a function of supplying a data voltage to each subpixel 110G. Each subpixel 110G is, for example, a green light-emitting subpixel. These subpixels 110G constitute one subpixel column.

Data voltage line R_Sig is connected to each subpixel 110R belonging to a pixel column including one or more subpixels 110R, and has a function of supplying data voltage Vdat_r (see FIG. 3) to each subpixel 110R. Each subpixel 110R is, for example, a red light-emitting subpixel. These subpixels 110R constitute one subpixel column.

Hereafter, subpixels 110B, 110G, and 110R are also referred to as "subpixel 110B, etc.", and data voltages Vdat_b, Vdat_g, and Vdat_r are also referred to as "data voltage Vdat_b, etc.".

Thus, data voltage line B_Sig, etc. are provided for each pixel column in the plurality of pixels 110, to charge subpixel 110B, etc. with data voltage Vdat_b, etc. corresponding to image data. Hereafter, charging is also referred to as "writing".

As illustrated in FIG. 2, selector circuit 120 is connected between data voltage line B_Sig, etc. and data driver 13, and switches, in a time division manner, data voltage line B_Sig, etc. for supplying data voltage Vdat_b, etc. from data driver 13. Selector circuit 120 includes a plurality of switch portions (for example, switch portions 120*a* and 120*b*). For example, switch portion 120*a* is connected between data voltage line B_Sig, etc. and data integrated circuit (IC) 13*a*, and has a function of selectively supplying data voltage Vdat_b, etc. from data IC 13*a* included in data driver 13 to selected data voltage line B_Sig, etc.

Switch portion 120*a* is provided for each pixel column, and includes selection transistors $TSeg_B$, $TSeg_G$, and $TSeg_R$ which are thin-film transistors arranged for the respective subpixel columns. Selection transistors $TSeg_B$, $TSeg_G$, and $TSeg_R$ are switching transistors for switching the connection between data voltage line B_Sig, etc. and data driver 13.

One of the source electrode and the drain electrode of selection transistor $TSeg_B$ is connected to data voltage line B_Sig, and the other one of the source electrode and the drain electrode is connected to data IC 13*a*. The gate electrode of selection transistor $TSeg_B$ is connected to selector control line SELL.

One of the source electrode and the drain electrode of selection transistor $TSeg_G$ is connected to data voltage line G_Sig, and the other one of the source electrode and the drain electrode is connected to data IC 13*a*. The gate electrode of selection transistor $TSeg_G$ is connected to selector control line SEL2.

One of the source electrode and the drain electrode of selection transistor $TSeg_R$ is connected to data voltage line R_Sig, and the other one of the source electrode and the drain electrode is connected to data IC 13*a*. The gate electrode of selection transistor $TSeg_R$ is connected to selector control line SEL3.

As a result of controller 20 controlling on and off of selection transistors $TSeg_R$, $TSeg_G$, and $TSeg_R$ via selector control lines SEL1, SEL2, and SEL3, selector circuit 120 supplies data voltage Vdat, etc. from data IC 13*a* (data driver 13) to data voltage line B_Sig, etc. In a time division manner. Selector circuit 120 is a column switching circuit (subpixel column switching circuit) that switches the electrical connection between data IC 13*a* and any of data voltage line B_Sig, etc. Hereafter, selector control lines SEL1, SEL2, and SEL3 are also simply referred to as “selector control lines SEL”.

Control signal SEL for controlling selector circuit 120 is supplied from controller 20 to each selector control line SEL. For example, selector control line SEL1 is connected to the gate electrode of selection transistor $TSeg_B$, and control signal SEL1 for controlling on and off of selection transistor $TSeg_B$ is supplied from controller 20 to selector control line SELL. For example, selector control line SEL2 is connected to the gate electrode of selection transistor $TSeg_G$, and control signal SEL2 for controlling on and off of selection transistor $TSeg_G$ is supplied from controller 20 to selector control line SEL2. For example, selector control line SEL3 is connected to the gate electrode of selection transistor $TSeg_R$, and control signal SEL3 for controlling on and off of selection transistor $TSeg_R$ is supplied from controller 20 to selector control line SEL3. Selector control line SEL is an example of a first selector control line, and control signal SEL is an example of a selector control signal.

For example, when control signal SEL1 input to selector control line SEL1 transitions from low level to high level, selection transistor $TSeg_R$ is turned on, and data voltage Vdat_b from data IC 13*a* is supplied to data voltage line B_Sig. Following this, when control signal SEL1 input to selector control line SEL1 transitions from high level to low level and then control signal SEL2 input to selector control line SEL2 transitions from low level to high level, selection transistor $TSeg_B$ is turned off and selection transistor $TSeg_G$ is turned on, so that data voltage Vdat_g from data IC 13*a* is supplied to data voltage line G_Sig. Following this, when control signal SEL2 input to selector control line SEL2 transitions from high level to low level and then control signal SEL3 input to selector control line SEL3 transitions from low level to high level, selection transistor $TSeg_G$ is turned off and selection transistor $TSeg_R$ is turned on, so that data voltage Vdat_r from data IC 13*a* is supplied to data voltage line R_Sig.

Thus, switch portion 120*a* performs an operation of causing data voltage line B_Sig, etc. connected to switch portion 120*a* to hold data voltage Vdat_b, etc. in a time division manner. In this way, one data IC 13*a* can cause respective data voltage line B_Sig, etc. to hold data voltage Vdat_b, etc. corresponding to pixel currents supplied to light-emitting elements $EL_B$, $EL_G$, and $EL_R$.

The structure of switch portion 120*b* in selector circuit 120 is the same as that of switch portion 120*a*, and accordingly its description is omitted. Switch portion 120*b* is connected between data voltage line B_Sig, etc. and data IC 13*b*, and has a function of selectively supplying data voltages from data IC 13*b* included in data driver 13 to selected data voltage line B_Sig, etc.

In this embodiment, control signal SEL to selector control line SEL is transferred from right to left on the sheet of the drawing. In other words, controller 20 supplies control signal SEL to selector control line SEL from the second pixel 110*b* side out of first pixel 110*a* and second pixel 110*b*. That is, controller 20 supplies control signal SEL to selector control line SEL so as to transfer control signal SEL in a second direction from second pixel 110*b* to first pixel 110*a*.

Selector control lines SEL1, SEL2, and SEL3 respectively have input terminals TSb, TSg, and TSr connected to controller 20, at the right end on the sheet of the drawing. Selector control lines SEL1, SEL2, and SEL3 have no input terminals connected to controller 20, at the left end on the sheet of the drawing (the end on the side where WS signal gate driver 12*a*3 is located). That is, in the example in FIG. 1, the left end on the sheet of the drawing (an example of the end on the first pixel 110*a* side) of selector control lines SEL1, SEL2, and SEL3 is not connected to other controller 20. Thus, control signal SEL is input to selector control lines SEL1, SEL2, and SEL3 from one side.

Data voltage line B_Sig, etc. connected to first pixel 110*a* in dashed line region R are an example of a first data voltage line, and data voltage line B_Sig, etc. connected to second pixel 110*b* in the region adjacent to dashed line region R are an example of a second data voltage line. The first data voltage line and the second data voltage line are, for example, arranged adjacent to each other.

Switch portion 120*a* is not limited to selectively switching between three data voltage lines B_Sig, etc., as long as switch portion 120*a* is configured to selectively switch between two or more data voltage lines B_Sig, etc. Switch portion 120*a* includes as many selection transistors as data voltage lines B_Sig, etc. to be switched.

Referring back to FIG. 1, controller 20 is a circuit that controls display panel 10. Controller 20 receives a video signal from outside, and controls first gate driver 12*a*, second gate driver 12*b*, data driver 13, and selector circuit 120 so that an image represented by the video signal will be displayed on display 11. For example, controller 20 supplies control signal SEL for controlling selector circuit 120, to selector control line SEL. Controller 20 is connected to only the end on the second pixel 110*b* side (input terminals TSb, TSg, and TSr) of selector control line SEL out of the end on the first pixel 110*a* side and the end on the second pixel 110*b* side.

Power source 30 supplies operation power of display device 1 to each component in display device 1. Power source 30 supplies, for example, operation power to display 11, first gate driver 12*a*, second gate driver 12*b*, data driver 13, controller 20, and selector circuit 120. Power source 30 supplies, for example, initialization voltage VINI, reference voltage VREF, positive power source voltage VCC, and negative power source voltage VCATH to display 11.

First gate driver 12*a* and second gate driver 12*b* supply various control signals for controlling the operations of pixels 110, to pixels 110 via control signal lines. First gate driver 12*a* functions as a scan line drive circuit.

The control signal lines include write signal line WS, initialization signal line INI, and reference signal line REF. Write signal line WS is an example of a first gate control line. Write signal line WS is provided for each pixel row in the plurality of pixels 110, and used to supply control signal WS for selecting a pixel row (for example, subpixel row) to which data voltage Vdat_b, etc. corresponding to image data are to be written. Initialization signal line INI is an example of a second gate control line. Initialization signal line INI is provided for each pixel row in the plurality of pixels 110, and used to supply control signal INI for initializing the potentials of light-emitting elements $EL_B$, $EL_G$, and $EL_R$. Reference signal line REF is an example of a third gate control line. Reference signal line REF is provided for each pixel row in the plurality of pixels 110, and used to supply control signal REF for supplying reference voltage VREF to the gate electrodes of drive transistors $TD_B$, $TD_G$, and $TD_R$ (see FIG. 3).

First gate driver 12*a* includes INI signal gate driver 12*a*1, Ref signal gate driver 12*a*2, and WS signal gate driver 12*a*3. INI signal gate driver 12*a*1, Ref signal gate driver 12*a*2, and WS signal gate driver 12*a*3 each include a plurality of shift registers. Each shift register includes, for example, a complementary metal-oxide-semiconductor (CMOS) circuit or a polysilicon thin-film transistor of n-channel type or p-channel type, although not limited to such.

Second gate driver 12*b* includes INI signal gate driver 12*b*1 and Ref signal gate driver 12*b*2. Second gate driver 12*b* does not include a WS signal gate driver. Second gate driver 12*b* located on the side where control signal SEL from controller 20 is input to selector control line SEL (the right side on the sheet of the drawing) does not include a WS signal gate driver. Thus, in display device 1 in this embodiment, WS signal gate driver 12*a*3 is included only in first gate driver 12*a* located on the side where control signal SEL from controller 20 is not input to selector circuit 120 (the left side on the sheet of the drawing).

INI signal gate drivers 12*a*1 and 12*b*1 are gate drivers that are connected to the respective gate electrodes of initialization transistors $T1_B$, $T1_G$, and $T1_R$ (see FIG. 3) via initialization signal line INI and perform an initialization operation of initializing the potentials of the respective electrodes (for example, anodes) of light-emitting elements $EL_B$, $EL_G$, and $EL_R$ included in pixel 110. INI signal gate drivers 12*a*1 and 12*b*1 control on and off of initialization transistors $T1_B$, $T1_G$, and $T1_R$ by control signal INI. INI signal gate drivers 12*a*1 and 12*b*1 input control signal INI from both sides of initialization signal line INI. Control signal INI is an example of a second gate control signal, and INI signal gate driver 12*a*1 is an example of a second gate driver. The initialization operation is performed before a threshold compensation operation.

Ref signal gate drivers 12*a*2 and 12*b*2 are gate drivers that are connected to the respective gate electrodes of compensation transistors $T2_B$, $T2_G$, and $T2_R$ (see FIG. 3) via reference signal line REF and perform a threshold compensation operation of compensating the threshold voltages of drive transistors $TD_B$, $TD_G$, and $TD_R$. Ref signal gate drivers 12*a*2 and 12*b*2 control on and off of compensation transistors $T2_B$, $T2_G$, and $T2_R$ by control signal REF.

Ref signal gate drivers 12*a*2 and 12*b*2 input control signal REF from both sides of reference signal line REF. Control signal REF is an example of a third gate control signal, and Ref signal gate driver 12*a*2 is an example of a third gate driver.

WS signal gate driver 12*a*3 is connected to the respective gate electrodes of write transistors $T3_B$, $T3_G$, and $T3_R$ (see FIG. 3) via write signal line WS, and cause holding capacitors $CS_B$, $CS_G$, and $CS_R$ to respectively hold data voltages Vdat_b, Vdat_g, and Vdat_r. WS signal gate driver 12*a*3 supplies control signal WS for controlling on and off of write transistors $T3_B$, $T3_G$, and $T3_R$, to write signal line WS. WS signal gate driver 12*a*3 inputs control signal WS from one side of write signal line WS. WS signal gate driver 12*a*3 is connected to only the end of write signal line WS on the first pixel 110*a* side out of the end on the first pixel 110*a* side (input terminal TW1, etc.) and the end on the second pixel 110*b* side. Control signal WS is an example of a first gate control signal.

Display device 1 thus has a structure of inputting the respective control signals to initialization signal line INI and reference signal line REF from both sides of display 11 and inputting control signal WS to write signal line WS from one side of display 11, among write signal line WS, initialization signal line INI, and reference signal line REF. Since the component circuits can be reduced as compared with the case of inputting control signal WS to write signal line WS from both sides of display 11, the frame of display device 1 can be reduced on at least one side.

In this embodiment, control signal WS to write signal line WS is transferred from left to right on the sheet of the drawing, as illustrated in FIG. 2. In other words, WS signal gate driver 12*a*3 inputs control signal WS to write signal line WS from the left side on the sheet of the drawing, for example, from the first pixel 110*a* side out of first pixel 110*a* and second pixel 110*b*. That is, WS signal gate driver 12*a*3 supplies control signal WS to write signal line WS so as to transfer control signal WS in a first direction from first pixel 110*a* to second pixel 110*b*.

The plurality of write signal lines WS each have an input terminal connected to first gate driver 12*a*, at the left end on the sheet of the drawing. For example, of write signal lines WS of n rows (where n is an integer of 2 or more), write signal line WS1 has input terminal TW1, write signal line WS2 has input terminal TW2, write signal line WSn−1 has input terminal TWn−1, and write signal line WSn has input terminal TWn. The plurality of write signal lines WS each do not have an input terminal connected to second gate driver 12*b*, at the right end on the sheet of the drawing. That is, in the example in FIG. 1, the right end of each of the plurality of write signal lines WS on the sheet of the drawing (an example of the end on the second pixel 110*b* side) is not connected to another WS signal gate driver.

Therefore, write signal line WS and selector control line SEL have their input terminals on the sides opposite to each other in the direction in which write signal line WS and selector control line SEL extend (i.e. the horizontal direction on the sheet of the drawing). The respective control signals are input to write signal line WS and selector control line SEL from the sides opposite to each other in the direction. The transfer direction of control signal WS in write signal line WS and the transfer direction of control signal SEL In selector control line SEL are opposite directions.

Referring back to FIG. 1, data driver 13 supplies data voltage Vdat_b, etc. corresponding to luminance to pixel 110 via data voltage line B_Sig, etc. Data voltage Vdat_b, etc. are each a voltage signal based on display gradation of pixel 110. Data driver 13 outputs data voltage Vdat_b, etc. to data voltage line B_Sig, etc. via selector circuit 120 in a time division manner, thus driving circuit elements in the light-emitting pixel. Data driver 13 functions as a signal line drive circuit.

The plurality of pixels 110 will be described below, with reference to FIG. 3. FIG. 3 is a circuit diagram illustrating an example of the structure of a pixel circuit in display device 1 according to this embodiment.

As illustrated in FIG. 3, pixel (pixel circuit) 100 includes subpixels (subpixel circuits) 110B, 110G, and 110R. Subpixels 110B, 110G, and 110R have the same structure, except light-emitting elements $EL_B$, $EL_G$, and $EL_R$. The structure of the pixel circuit will be described below, using subpixel 110R as an example.

Subpixel 110R includes initialization transistor $T1_R$, compensation transistor $T2_R$, write transistor $T3_R$, holding capacitor $CS_R$, drive transistor $TD_R$, and light-emitting element $EL_R$. Initialization transistor $T1_R$, compensation transistor $T2_R$, write transistor $T3_R$, and drive transistor $TD_R$ are an example of thin-film transistors included in pixel 110. Subpixel 110R also includes control signal lines (Initialization signal line INI, reference signal line REF, and write signal line WS), data voltage line R_Sig, positive power source line VCC, and cathode power source line VCATH. Initialization transistor $T1_R$ and compensation transistor $T2_R$ are not essential structural elements.

Initialization transistor $T1_R$ is turned on according to control signal INI, and supplies initialization voltage VINI to the source electrode (source node) of drive transistor $TD_R$.

The gate electrode of initialization transistor $T1_R$ is connected to each of INI signal gate drivers 12a1 and 12b1.

Compensation transistor $T2_R$ is turned on according to control signal REF, and supplies reference voltage VREF to the gate electrode (gate node) of drive transistor $TD_R$. This initializes the potential of an electrode (for example, anode) of light-emitting element $EL_R$. The gate electrode of compensation transistor $T2_R$ is connected to each of Ref signal gate drivers 12a2 and 12b2.

Write transistor $T3_R$ is turned on according to control signal WS, and causes holding capacitor $CS_R$ to hold data voltage Vdat_r. The gate electrode of write transistor $T3_R$ is connected to WS signal gate driver 12a3.

Write transistor $T3_R$ is connected between data voltage line R_Sig and the gate electrode of drive transistor $TD_R$. Specifically, one of the source electrode and the drain electrode of write transistor $T3_R$ is connected to data voltage line R_Sig, and the other one of the source electrode and the drain electrode is connected to one of the source electrode and the drain electrode of compensation transistor $T2_R$ and the gate electrode of drive transistor $TD_R$.

Holding capacitor $CS_R$ holds data voltage Vdat_r supplied via data voltage line R_Sig.

Drive transistor $TD_R$ has one of the source electrode and the drain electrode connected to positive power source line VCC and the other one of the source electrode and the drain electrode connected to the anode of light-emitting element $EL_R$, and supplies current to light-emitting element $EL_R$ according to data voltage Vdat_r held in holding capacitor $CS_R$. Consequently, light-emitting element $EL_R$ emits light at luminance corresponding to data voltage Vdat_r.

Light-emitting element $EL_R$ is a self light-emitting element. In this embodiment, light-emitting element $EL_R$ is an organic electroluminescent (EL) element. The anode electrode of light-emitting element $EL_R$ is connected to one of the source electrode and the drain electrode of drive transistor $TD_R$. A cathode voltage (negative power source voltage) is applied to the cathode electrode of light-emitting element $EL_R$ by cathode power source line (negative power source line) VCATH.

In FIG. 3, gate potential $Vg_R$ represents the potential of the gate electrode of drive transistor $TD_R$, and source potential $Vs_R$ represents the potential of the source electrode of drive transistor $TD_R$.

Each of the transistors described above is, for example, an n-type thin-film transistor (n-type TFT). Alternatively, each of the transistors may be a p-type thin-film transistor (p-type TFT).

[1-2. Mechanism of Occurrence of Luminance Unevenness and Mechanism of Prevention of Luminance Unevenness]

A mechanism of occurrence of luminance unevenness and a mechanism of prevention of luminance unevenness in display device 1 will be described below, with reference to FIG. 4 to FIG. 8C.

Figure 4:
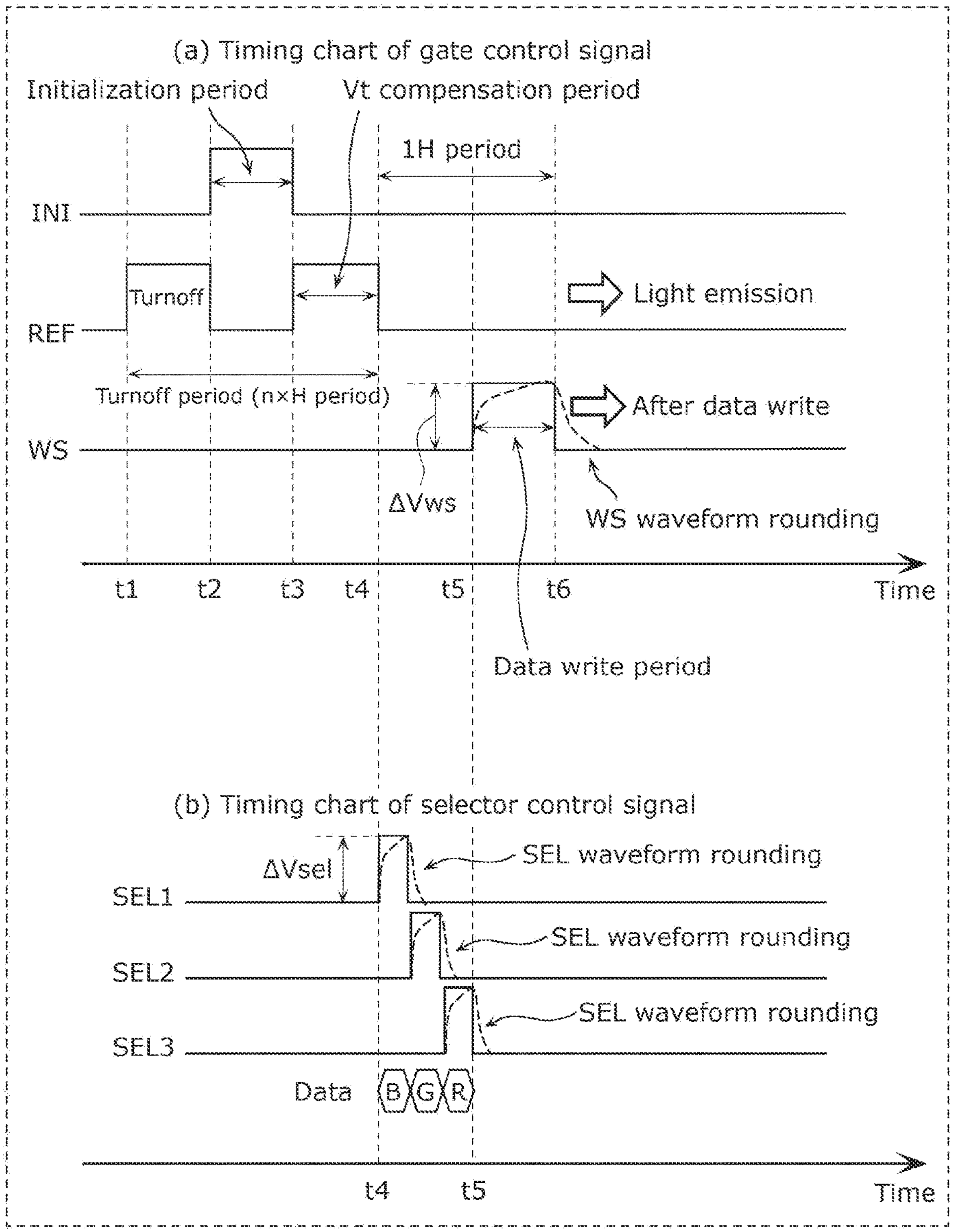
FIG. 4 is a diagram illustrating a timing chart of each type of control signal.

First, waveform rounding that occurs in control signal WS will be described below, with reference to FIG. 4. FIG. 4 is a diagram illustrating a timing chart of each type of control signal. Specifically, (a) in FIG. 4 illustrates a timing chart of gate control signals (control signals INI, REF, and WS), and (b) in FIG. 4 illustrates a timing chart of selector control signals (control signals SEL1 to SEL3). The timing charts illustrated in FIG. 4 are timing charts in one pixel row.

In control signal WS illustrated in (a) in FIG. 4, the solid line represents a waveform (pulse waveform) output from WS signal gate driver 12a3, and the dashed line represents a waveform (waveform containing rounding) actually supplied to write signal line WS. In each of control signals SEL1, SEL2, and SEL3 illustrated in (b) in FIG. 4, the solid line represents a waveform (pulse waveform) output from controller 20, and the dashed line represents a waveform (waveform containing rounding) actually supplied to selector control line SEL. The waveforms illustrated in (a) and (b) in FIG. 4 are examples, as the shape of the dashed line (the degree of waveform rounding) can vary depending on the position from the input terminal.

As illustrated in (a) in FIG. 4, the period from time t1 to time t4 is a turnoff period. At time t1, control signal REF transitions from low level to high level to turn on compensation transistors $T2_B$, $T2_G$, and $T2_R$, as a result of which the turnoff period starts. The period from time t2 to time t3 is an initialization period during which control signal REF is low level, control signal INI is high level, and an initialization operation is performed. The period from time t3 to time t4 is a threshold compensation period (Vt compensation period) during which control signal REF is high level, control signal INI is low level, and a threshold compensation operation is performed.

The period from time t4 to time t5 is a period during which data voltage Vdat_b, etc. are supplied to respective data voltage line B_Sig, etc. in time series. During the period from time t4 to time t5, data voltage line B_Sig, etc. are selectively charged with data voltage Vdat_b, etc. by selector circuit 120, before a data write period. For example, during the period from time t4 to time t5, data voltage lines B_Sig, G_Sig, and R_Sig connected to data IC 13a are selectively switched in synch with sequential output of data voltages Vdat_b, Vdat_g, and Vdat_r from data IC 13a according to control signal SEL supplied from controller 20, to charge data voltage lines B_Sig, G_Sig, and R_Sig respectively with data voltages Vdat_b, Vdat_g, and Vdat_r.

During the period from time t5 to time t6, control signals SEL1, SEL2, and SEL3 are each low level, so that data voltage line B_Sig, etc. are in a floating state. During the period from time t5 to time t6, control signal WS is high level, so that write transistors $T3_B$, $T3_G$, and $T3_R$ are turned on, and respective data voltage Vdat_b, etc. held in data voltage line B_Sig, etc. are written to holding capacitors $CS_B$, $CS_G$, and $CS_R$. The period from time t5 to time t6 is a data write period. The data write period is a period that can directly influence pixel current (subpixel current) for controlling gradation display.

The turnoff period is a period for initial setting. Specifically, the turnoff period is a period during which each subpixel circuit is not on (i.e. black display). Suppose the number of pixel rows is n, and one horizontal period is 1H. Then, the turnoff period is, for example, a period of n×H. Herein, "black display" is not limited to complete black display (non-light emission), and includes substantial black display, such as display at less than or equal to predetermined luminance.

As illustrated in (a) in FIG. 4, control signal WS has waveform rounding (WS waveform rounding in (a) in FIG. 4) due to a signal delay of control signal WS. The waveform rounding in control signal WS is greater when the distance from WS signal gate driver 12a3 (for example, the distance from the input terminal of write signal line WS) is greater in write signal line WS. The waveform rounding in control signal WS can occur due to a signal delay caused by the parasitic capacitance of pixel 110 and the wiring resistance of write signal line WS. The parasitic capacitance of pixel 110 includes the sum of the respective parasitic capacitances between write transistors $T3_B$, $T3_G$, and $T3_R$ and drive transistors $TD_B$, $TD_G$, and $TD_R$ in pixel 110.

Feedthrough voltage ΔVfs_vg caused as a result of write transistor T3 being turned off at time t6 will be described below. Let Cws_CR (=Cws_tft/Ctot_vg) be a capacitance ratio where Ctot_vg is the whole parasitic capacitance of pixel 110 and Cws_tft is the capacitance between the gate of the write transistor (for example, write transistor $T3_R$) in pixel 110 and a line of the write transistor (for example, the gate-drain capacitance of the write transistor). Feedthrough voltage ΔVfs_vg is calculated according to the following Formula 1, where ΔVws is the amplitude of control signal WS.

$$\Delta Vfs\_vg = \Delta Vws \times Cws\_CR \quad \text{(Formula 1).}$$

When write transistor T3 is turned off at time t6, the voltage held in data voltage line B_Sig, etc. decreases from data voltage Vdat_b, etc. by feedthrough voltage ΔVfs_vg calculated according to Formula 1.

Formula 1 indicates feedthrough voltage ΔVfs_vg that occurs when control signal WS is a square wave, that is, when control signal WS has no rounding. In the case where waveform rounding occurs in control signal WS, feedthrough voltage ΔVfs_vg is smaller than in the case where control signal WS is a square wave. When the waveform rounding in control signal WS is greater, feedthrough voltage ΔVfs_vg is smaller. For example, in the case where data voltage Vdat_b, etc. of the same potential are supplied to data voltage line B_Sig, etc. from time t4 to time t5, when the waveform rounding in control signal WS is greater, the voltages written to holding capacitors $CS_B$, $CS_G$, and $CS_R$ after write transistor T3 is turned off are closer to data voltage Vdat_b, etc. held in data voltage line B_Sig, etc.

Moreover, the waveform rounding in control signal WS is greater at a position farther from the output of WS signal gate driver 12*a*3 in write signal line WS, i.e. a position farther from input terminal TW1 or the like in write signal line WS, than at a position closer to the output of WS signal gate driver 12*a*3 in write signal line WS, i.e. a position closer to input terminal TW1 or the like in write signal line WS. Therefore, feedthrough voltage ΔVfs_vg at a position closer to the output of WS signal gate driver 12*a*3 in write signal line WS (for example, feedthrough voltages ΔVfs_vg1 and ΔVfs_vg3 illustrated in FIG. 5) is larger than feedthrough voltage ΔVfs_vg at a position farther from the output of WS signal gate driver 12*a*3 in write signal line WS (for example, feedthrough voltage ΔVfs_vg2 illustrated in FIG. 5).

Consequently, in pixel 110 connected to data voltage line B_Sig, etc. at a position closer to the output of WS signal gate driver 12*a*3 in write signal line WS, the decrease in data voltage Vdat_b, etc. after write transistor T3 is turned off is greater, which results in smaller pixel current (subpixel current). Meanwhile, in pixel 110 connected to data voltage line B_Sig, etc. at a position farther from the output of WS signal gate driver 12*a*3 in write signal line WS, the decrease in data voltage Vdat_b, etc. after write transistor T3 is turned off is smaller, which results in larger pixel current. Thus, the difference in feedthrough voltage ΔVfs_vg depending on the position of pixel 110 leads to the difference in pixel current, which can cause luminance unevenness.

As illustrated in (b) in FIG. 4, control signal SEL has waveform rounding (SEL waveform rounding in (b) in FIG. 4) due to a signal delay of control signal SEL. This causes a charging delay of data voltage Vdat_b, etc. to data voltage line B_Sig, etc. The waveform rounding in control signal SEL is greater when the distance from the input terminal is greater in selector control line SEL. The waveform rounding in control signal SEL can occur due to a signal delay caused by the parasitic capacitance between data voltage line B_Sig, etc. and selector control line SEL, the parasitic capacitance of the switch portion (for example, switch portion 120*a*), and the wiring resistance of selector control line SEL. The parasitic capacitance of the switch portion includes the respective gate-source/drain parasitic capacitances of selection transistors $TSeg_B$, $TSeg_G$, and $TSeg_R$.

Feedthrough voltage ΔVfs_sig caused as a result of each of selection transistors $TSeg_B$, $TSeg_G$, and $TSeg_R$ being turned off in the period from time t4 to time t5 will be described below. Let Csel_CR (=Csel_tft/Ctot_sig) be a capacitance ratio where Ctot_sig is the whole parasitic capacitance (total parasitic capacitance) between data voltage line B_Sig, etc. and selector control line SEL and Csel_tft is the capacitance between the gate of the selection transistor (for example, selection transistor $TSeg_R$) and the source/drain of the selection transistor. Feedthrough voltage ΔVfs_sig is calculated according to the following Formula 2, where ΔVsel is the amplitude of control signal SEL.

$$\Delta Vfs\_sig = \Delta Vsel \times Csel\_CR \quad \text{(Formula 2).}$$

When selection transistors $TSeg_B$, $TSeg_G$, and $TSeg_R$ are turned off sequentially from time t4 to time t5, the voltage held in data voltage line B_Sig, etc. decreases from data voltage Vdat_b, etc. supplied from data driver 13 by feedthrough voltage ΔVfs_sig calculated according to Formula 2.

Formula 2 indicates feedthrough voltage ΔVfs_sig that occurs when control signal SEL is a square wave, that is, when control signal SEL has no rounding. In the case where waveform rounding occurs in control signal SEL, feedthrough voltage ΔVfs_sig is smaller than in the case where control signal SEL is a square wave. When the waveform rounding in control signal SEL is greater, feedthrough voltage ΔVfs_sig is smaller. For example, in the case where data voltage Vdat_b, etc. of the same potential are output to data voltage line B_Sig, etc. from time t4 to time t5, when the waveform rounding is greater, the voltages held in data voltage line B_Sig, etc. after selection transistors $TSeg_B$, $TSeg_G$, and $TSeg_R$ are turned off are closer to data voltage Vdat_b, etc. output from data driver 13.

Moreover, the waveform rounding in control signal SEL is greater at a position farther from input terminal TSb, etc. in selector control line SEL than at a position closer to input terminal TSb, etc. in selector control line SEL. Therefore, feedthrough voltage ΔVfs_sig at a position closer to input terminal TSb, etc. in selector control line SEL (for example, feedthrough voltages ΔVfs_sig1 and ΔVfs_sig3 illustrated in FIG. 5) is larger than feedthrough voltage ΔVfs_sig at a position farther from input terminal TSb, etc. in selector control line SEL (for example, feedthrough voltage ΔVfs_sig2 illustrated in FIG. 5).

Consequently, the decrease in data voltage line B_Sig, etc. at a position closer to input terminal TSb, etc. in selector control line SEL after selection transistors $TSeg_B$, $TSeg_G$, and $TSeg_R$ in switch portion 120*a* are turned off is greater, which results in smaller pixel current (subpixel current). Meanwhile, the decrease in data voltage line B_Sig, etc. at a position farther from input terminal TSb, etc. in selector control line SEL after selection transistors $TSeg_B$, $TSeg_G$, and $TSeg_R$ in switch portion 120*a* are turned off is smaller, which results in larger pixel current. Thus, the difference in feedthrough voltage ΔVfs_sig depending on the position of pixel 110 leads to the difference in pixel current, which can cause luminance unevenness.

Figure 5:
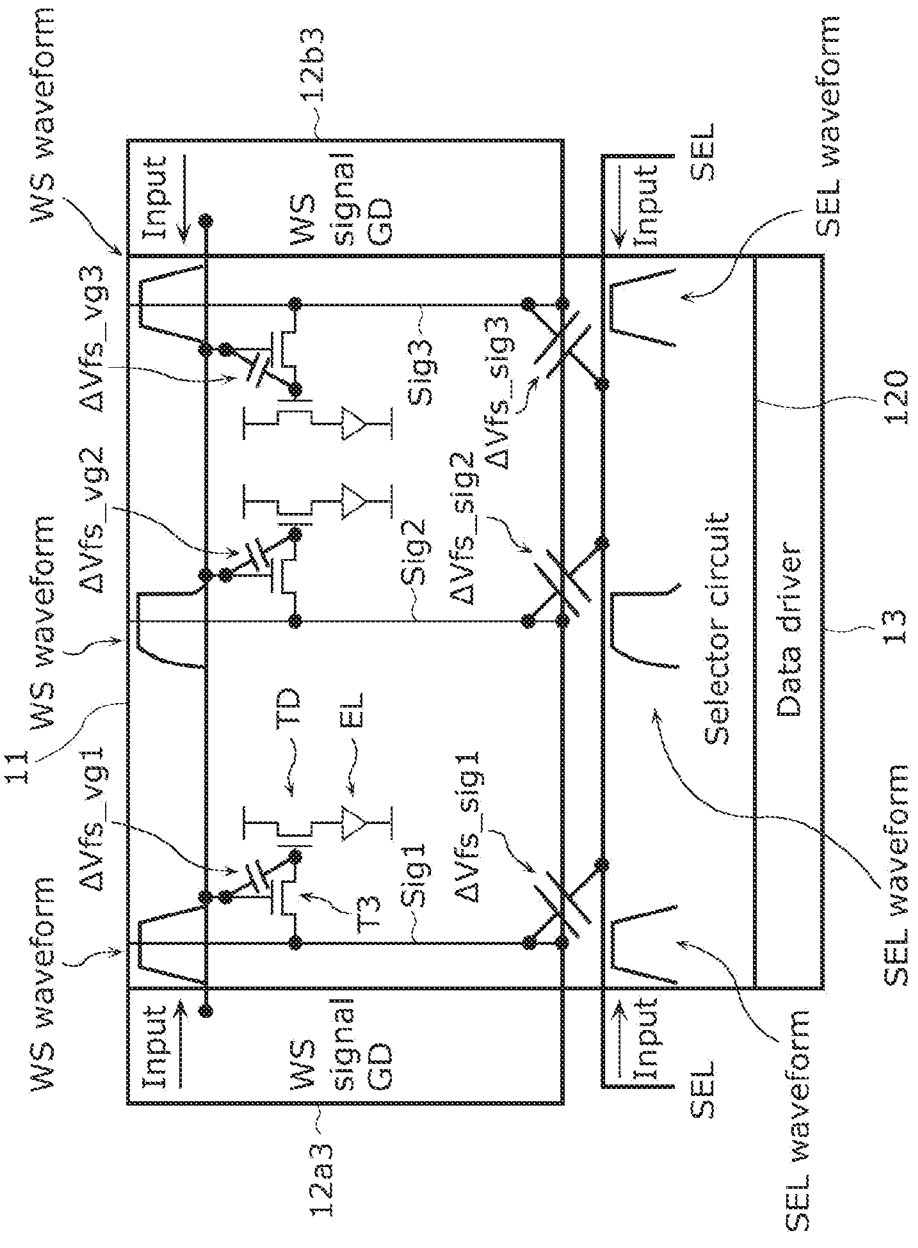
FIG. 5 is a schematic diagram for explaining occurrence of luminance unevenness in a display device according to a comparative example.

Luminance unevenness in a display device according to a comparative example will be described below, with reference to FIG. 5 to FIG. 6C. FIG. 5 is a schematic diagram for explaining occurrence of luminance unevenness in the display device according to the comparative example. FIG. 6A is a diagram illustrating the magnitude of feedthrough voltage ΔVfs (ΔVfs_vg) at each pixel position in the display device according to the comparative example. FIG. 6B is a diagram illustrating the magnitude of feedthrough voltage ΔVfs (ΔVfs_sig) at each switch position in the display device according to the comparative example. FIG. 6C is a diagram illustrating the magnitude of feedthrough voltage ΔVfs (total feedthrough voltage) at each in-plane position in the display device according to the comparative example.

In the display device according to the comparative example, control signals are input to each of write signal line WS and selector control line SEL from both sides. The display device according to the comparative example includes WS signal gate drivers 12*a*3 and 12*b*3 on both sides of display 11.

For example, data voltage lines Sig1 and Sig3 are data voltage lines located at both ends, and data voltage line Sig2 is a data voltage line located between data voltage lines Sig1 and Sig3, such as at the center of display 11. Feedthrough voltages ΔVfs_vg1 and ΔVfs_sig1 represent feedthrough voltages that occur in pixel 110 connected to data voltage line Sig1. Feedthrough voltages ΔVfs_vg2 and ΔVfs_sig2 represent feedthrough voltages that occur in pixel 110 connected to data voltage line Sig2. Feedthrough voltages ΔVfs_vg3 and ΔVfs_sig3 represent feedthrough voltages that occur in pixel 110 connected to data voltage line Sig3.

In FIG. 5, T3 denotes a write transistor, TD denotes a drive transistor, and EL denotes a light-emitting element, for convenience's sake.

As illustrated in FIG. 6A, feedthrough voltage ΔVfs_vg1 (position: left) illustrated in FIG. 5 is large (inclination: steep) because the position is close to WS signal gate driver 12*a*3 (e.g. close to the input terminal to which control signal WS from WS signal gate driver 12*a*3 is input) and the waveform rounding in control signal WS is small. Likewise, feedthrough voltage ΔVfs_vg3 (position: right) illustrated in FIG. 5 is large (inclination: steep) because the position is close to WS signal gate driver 12*b*3 (e.g. close to the input terminal to which control signal WS from WS signal gate driver 12*b*3 is input) and the waveform rounding in control signal WS is small. Herein, the "inclination" denotes the inclination of control signal WS, and a steeper inclination corresponds to smaller waveform rounding. The "position" denotes the position of pixel 110 in display 11.

Feedthrough voltage ΔVfs_vg2 (position: center) illustrated in FIG. 5 is smaller (inclination: intermediate) than both ends of write signal line WS because the position is an Intermediate position between WS signal gate drivers 12*a*3 and 12*b*3 (e.g. the center of display 11 in the horizontal direction) and the waveform rounding in control signal WS is larger than both ends of write signal line WS.

As illustrated in FIG. 6B, feedthrough voltage ΔVfs_sig1 (position: left) illustrated in FIG. 5 is large (inclination: steep) because the position is close to a controller (not illustrated) (e.g. close to the left input terminal of control signal SEL) and the waveform rounding in control signal SEL is small. Likewise, feedthrough voltage ΔVfs_sig3 (position: right) illustrated in FIG. 5 is large (inclination: steep) because the position is close to a controller (not illustrated) (e.g. close to the right input terminal of control signal SEL) and the waveform rounding in control signal SEL is small.

Feedthrough voltage ΔVfs_sig2 (position: center) illustrated in FIG. 5 is smaller (inclination: intermediate) than both ends of control signal SEL (inclination: intermediate) because the position is an intermediate position between the two controllers (e.g. intermediate between the left and right input terminals, such as at the center of display 11 in the horizontal direction) and the waveform rounding in control signal SEL is greater than in the pixels near the left and right input terminals.

As illustrated in FIG. 6C, significant luminance unevenness can occur between the left and right regions and the center region in display 11 due to the results in FIG. 6A and FIG. 6B. For example, in the case where data driver 13 outputs data voltage Vdat_b, etc. of the same potential to each data voltage line including data voltage lines Sig1, Seg2, and Sig3, the luminance is supposed to be uniform in display 11. In the display device according to the comparative example, however, the center region is brighter than the left and right regions. In the display device according to the comparative example, the pixel column (left and right pixel columns) with large feedthrough voltage ΔVfs_vg due to waveform rounding in control signal WS and the pixel column (left and right pixel columns) with large feedthrough voltage ΔVfs_sig due to waveform rounding in control signal SEL are the same, and the pixel column (center pixel column) with intermediate feedthrough voltage ΔVfs_vg due to waveform rounding in control signal WS and the pixel column (center pixel column) with intermediate feedthrough voltage ΔVfs_sig due to waveform rounding in control signal SEL are the same. Such feedthrough voltages ΔVfs_vg and &Vfs_sig overlap to cause significant total difference in feedthrough voltage ΔVfs of pixel 110 between the left and right regions and the center region. In the display device according to the comparative example, this significant difference in pixel current flowing through light-emitting element EL in each pixel 110 can lead to noticeable luminance unevenness.

As described above, the display device according to the comparative example is likely to have luminance unevenness resulting from overlap of luminance unevenness caused by a delay (signal delay) of control signal WS supplied from WS signal gate drivers 12*a*3 and 12*b*3 in the horizontal direction (the horizontal direction on the sheet of the drawing) and luminance unevenness caused by a delay (signal delay) of control signal SEL supplied from controller 20 in the horizontal direction (the horizontal direction on the sheet of the drawing).

Figure 7:
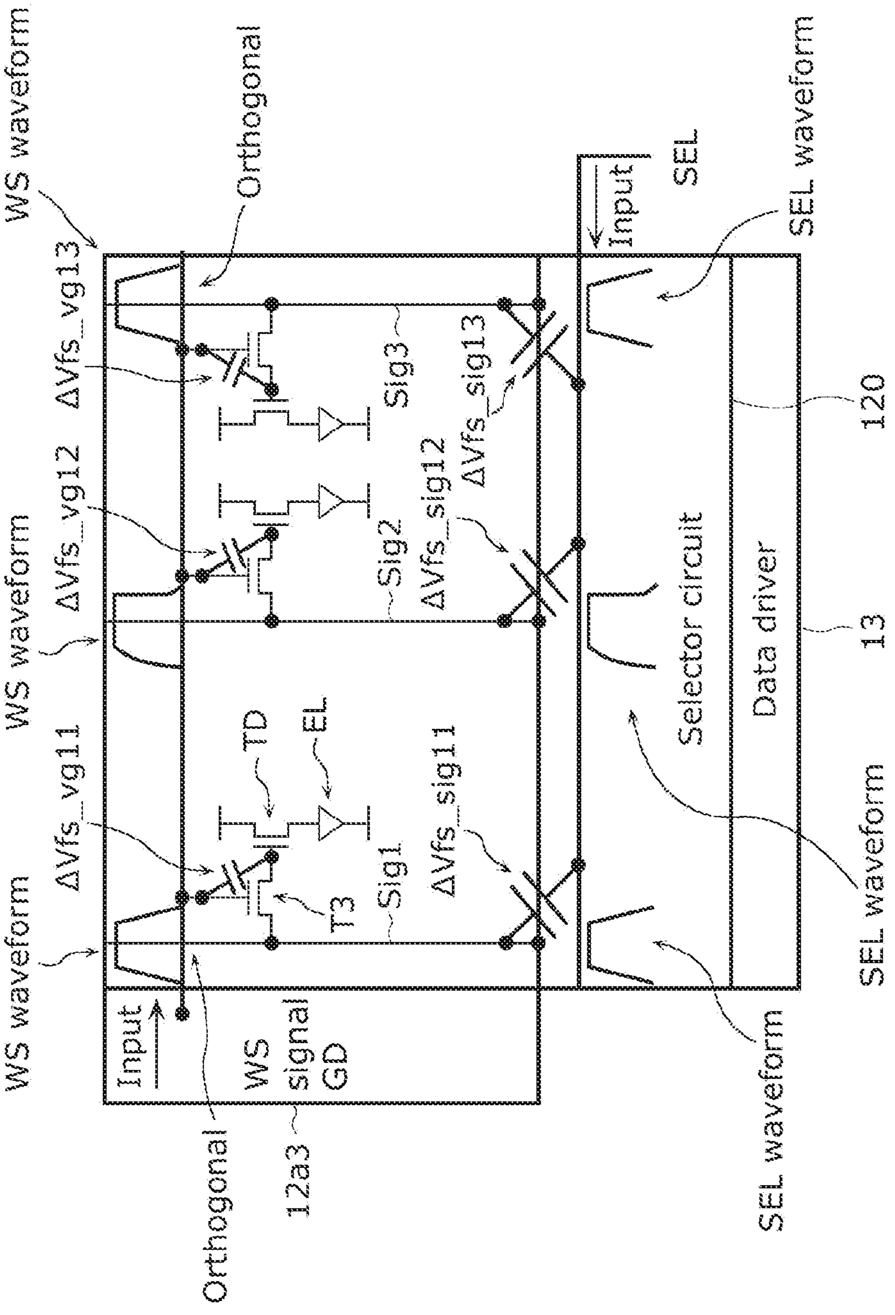
FIG. 7 is a schematic diagram for explaining prevention of luminance unevenness in the display device according to Embodiment 1.

Prevention of luminance unevenness in display device 1 according to this embodiment will be described below, with reference to FIG. 7 to FIG. 8C. FIG. 7 is a schematic diagram for explaining prevention of luminance unevenness in display device 1 according to this embodiment. FIG. 8A is a diagram illustrating the magnitude of feedthrough voltage ΔVfs (ΔVfs_vg) at each pixel position in display device 1 according to this embodiment. FIG. 8B is a diagram illustrating the magnitude of feedthrough voltage ΔVfs (ΔVfs_sig) at each switch position in display device 1 according to this embodiment. FIG. 8C is a diagram illustrating the magnitude of feedthrough voltage ΔVfs (total feedthrough voltage) at each in-plane position in display device 1 according to this embodiment.

As illustrated in FIG. 8A, feedthrough voltage ΔVfs_vg11 (position: left) illustrated in FIG. 7 is large (inclination: steep) because the position is close to WS signal gate driver 12*a*3 (e.g. close to the input terminal to which control signal WS from WS signal gate driver 12*a*3 is input) and the waveform rounding in control signal WS is small. Feedthrough voltage ΔVfs_vg12 (position: center) illustrated in FIG. 7 is smaller (inclination: intermediate) than the left end of write signal line WS because the position is the center of display 11 in the horizontal direction and the waveform rounding in control signal WS is larger than the left end of write signal line WS. That is, feedthrough voltage ΔVfs_vg12 is smaller than feedthrough voltage ΔVfs_vg11. The respective magnitudes of feedthrough voltage ΔVfs_vg11 and feedthrough voltage ΔVfs_vg12 are similar to the respective magnitudes of feedthrough voltage ΔVfs_vg1 and feedthrough voltage ΔVfs_vg2 in the display device according to the comparative example.

Feedthrough voltage ΔVfs_vg13 (position: right) illustrated in FIG. 7 is smaller than the center because the position is farther from WS signal gate driver 12*a*3 (e.g. farther from the input terminal to which control signal WS from WS signal gate driver 12*a*3 is input) and the waveform rounding in control signal WS is greater. The magnitude of feedthrough voltage ΔVfs_vg13 is smaller than the magnitude of feedthrough voltage ΔVfs_vg12. The magnitude of feedthrough voltage ΔVfs_vg13 is smaller than the magnitude of feedthrough voltage ΔVfs_vg3 in the display device according to the comparative example.

Thus, in display device 1, feedthrough voltage ΔVfs_vg decreases as the distance from WS signal gate driver 12*a*3 increases. In the example in FIG. 7, feedthrough voltage ΔVfs_vg decreases in the rightward direction.

As illustrated in FIG. 8B, feedthrough voltage ΔVfs_sig13 (position: right) illustrated in FIG. 7 is large (inclination: steep) because the position is close to controller 20 (e.g. close to the input terminal of control signal SEL) and the waveform rounding in control signal WS is small. Feedthrough voltage ΔVfs_sig12 (position: center) illustrated in FIG. 7 is smaller (inclination: intermediate) than in pixel 110 at the right end because the position is the center of display 11 in the horizontal direction and the waveform rounding in control signal SEL is greater than in pixel 110 near the input terminal. That is, feedthrough voltage ΔVfs_sig12 Is smaller than feedthrough voltage ΔVfs_sig13. The respective magnitudes of feedthrough voltage ΔVfs_sig12 and feedthrough voltage ΔVfs_sig13 are similar to the respective magnitudes of feedthrough voltage ΔVfs_sig2 and feedthrough voltage ΔVfs_sig3 in the display device according to the comparative example.

Feedthrough voltage ΔVfs_sig11 (position: left) illustrated in FIG. 7 is smaller than the center because the position is farther from controller 20 (e.g. farther from the input terminal of control signal SEL) and the waveform rounding in control signal SEL is greater. The magnitude of feedthrough voltage ΔVfs_sig11 is smaller than the magnitude of feedthrough voltage ΔVfs_sig12. The magnitude of feedthrough voltage ΔVfs_sig11 is smaller than the magnitude of feedthrough voltage ΔVfs_sig1 in the display device according to the comparative example.

Thus, in display device 1, feedthrough voltage ΔVfs_sig decreases as the distance from the input terminal connected to controller 20 increases. In the example in FIG. 7, feedthrough voltage ΔVfs_sig decreases in the leftward direction.

As illustrated in FIG. 7, in display device 1, data voltage line Sig13 at a position where the waveform rounding in control signal SEL of selector circuit 120 is minimum is orthogonal to write signal line WS at a point where the waveform rounding in control signal WS is maximum in write signal line WS (for example, position of rightmost pixel 110 in display 11). As illustrated in FIG. 7, in display device 1, data voltage line Sig11 at a position where the waveform rounding in control signal SEL of selector circuit 120 is maximum is orthogonal to write signal line WS at a point where the waveform rounding in control signal WS is minimum in write signal line WS (for example, position of leftmost pixel 110 in display 11).

As illustrated in FIG. 8C, luminance unevenness between the left and right regions and the center region in display 11 can be prevented in display device 1 due to the results in FIG. 8A and FIG. 8B. For example, in the case where data driver 13 outputs data voltage Vdat_b, etc. of the same potential to each data voltage line including data voltage lines Sig1, Seg2, and Sig3, the in-plane brightness is likely to be uniform in display device 1 as compared with the display device according to the comparative example. In display device 1, the pixel column (for example, left pixel column) with large feedthrough voltage ΔVfs_vg due to waveform rounding in control signal WS and the pixel column (for example, left pixel column) with small feedthrough voltage ΔVfs_sig due to waveform rounding in control signal SEL overlap, the pixel column (for example, right pixel column) with small feedthrough voltage ΔVfs_vg and the pixel column (for example, right pixel column) with large feedthrough voltage ΔVfs_sig overlap, and the pixel column (for example, center pixel column) with intermediate feedthrough voltage ΔVfs_vg and the pixel column (for example, center pixel column) with intermediate feedthrough voltage ΔVfs_sig overlap. Accordingly, total feedthrough voltage ΔVfs in each pixel 110 resulting from such overlap of feedthrough voltages ΔVfs_vg and ΔVfs_sig can be made uniform. Thus, in display device 1, uniform pixel current flows through light-emitting element EL in each pixel 110, with it being possible to prevent luminance unevenness.

As described above, in display device 1, the uniformity of in-plane luminance in display 11 can be improved with no need to incorporate a complex correction system (for example, arithmetic IC). Display device 1 can thus achieve both low cost and improved display quality.

[1-3. Effects, Etc.]

As described above, display device 1 according to this embodiment includes: a plurality of pixels 110 arranged in a matrix; a plurality of write signal lines WS that are each located at a different pixel row in the plurality of pixels 110, and to which control signal WS is supplied, control signal WS being for selecting a pixel row to which data voltage Vdat_b, etc. corresponding to image data is to be written; WS signal gate driver 12*a*3 that supplies control signal WS to the plurality of write signal lines WS; a plurality of data voltage lines B_Sig, etc. that are each located at a different pixel column in the plurality of pixels 110, and used to write data voltage Vdat_b, etc. corresponding to the image data; data driver 13 that supplies data voltage Vdat_b, etc. to the plurality of data voltage lines B_Sig, etc.; selector circuit 120 that is connected between data driver 13 and the plurality of data voltage lines B_Sig, etc., and switches data voltage line B_Sig, etc. to which data voltage Vdat_b, etc. from data driver 13 is supplied among the plurality of data voltage lines B_Sig, etc.; selector control line SEL to which control signal SEL for controlling selector circuit 120 is supplied; and controller 20 that supplies control signal SEL to selector control line SEL. The plurality of pixels 110 include first pixel 110*a* and second pixel 110*b* that belong to a same pixel row. WS signal gate driver 12*a*3 supplies control signal WS to the plurality of write signal lines WS to transfer control signal WS in a first direction from first pixel 110*a* to second pixel 110*b*, and controller 20 supplies control signal SEL to selector control line SEL to transfer control signal SEL in a second direction from second pixel 110*b* to first pixel 110*a*.

Thus, in display device 1, the total value of feedthrough voltage ΔVfs in pixel 110 combining feedthrough voltage ΔVfs_sig due to waveform rounding in control signal SEL and feedthrough voltage ΔVfs_vg due to waveform rounding in control signal WS can be made uniform as compared with the display device according to the comparative example. For example, in the case of causing light-emitting elements $EL_B$, $EL_G$, and $EL_R$ to emit light by the same data voltage Vdat_b, etc., display device 1 can reduce the difference in pixel current flowing through light-emitting elements $EL_B$, $EL_G$, and $EL_R$ as compared with the display device according to the comparative example. Hence, display device 1 according to this embodiment can prevent non-uniformity of in-plane luminance caused by feedthrough voltage ΔVfs. That is, display device 1 can prevent luminance unevenness caused by feedthrough voltage ΔVfs.

WS signal gate driver **12*a*3 is connected to, out of respective ends of each of the plurality of write signal lines WS on a first pixel 110*a* side and a second pixel 110*b* side, only the end (e.g. input terminal) on the first pixel 110*a* side, the first pixel 110*a* side being a side closer to first pixel 110*a*, the second pixel 110*b* side being a side closer to second pixel 110*b*. Controller 20 is connected to, out of respective ends of selector control line SEL on the first pixel 110*a* side and the second pixel 110*b* side, only the end (e.g. input terminal) on the second pixel 110*b*** side.

Thus, in display device 1, the value of feedthrough voltage ΔVfs in pixel 110 can be made further uniform. Moreover, in display device 1, the number of inputs of each of write signal line WS and selector control line SEL can be reduced as compared with the case where control signals are input from both sides of each of write signal line WS and selector control line SEL. Display device 1 that can further prevent non-uniformity of in-plane luminance caused by feedthrough voltage ΔVfs can therefore be provided at low cost.

The end of each of the plurality of write signal lines WS on the second pixel **110*b* side is not connected to an other gate driver, and the end of selector control line SEL on the first pixel 110*a*** side is not connected to an other controller.

Thus, in display device 1, the number of WS signal gate drivers for supplying control signal WS and the number of controllers for supplying control signal SEL can be reduced. For example, the number of ICs for control signal WS and the number of ICs for control signal SEL can be reduced. Display device 1 can therefore achieve both low cost and luminance unevenness prevention (i.e. improved display quality).

The light-emitting element EL is an organic EL element.

Thus, luminance unevenness in an organic EL display panel can be prevented.

Embodiment 2

[2-1. Structure of Display Device]

Figure 9:
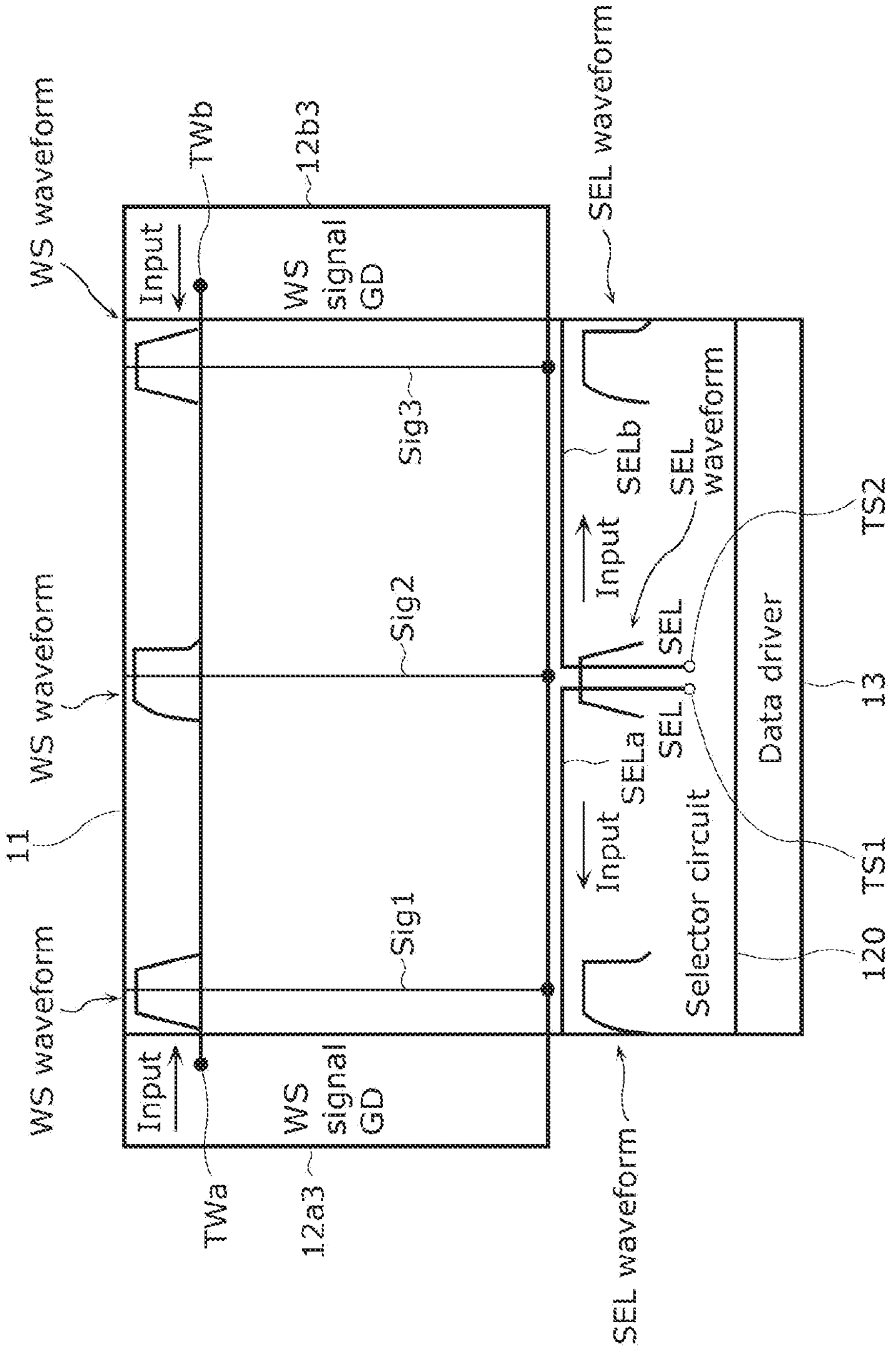
FIG. 9 is a schematic diagram for explaining prevention of luminance unevenness in a display device according to Embodiment 2.

A display device according to this embodiment will be described below, with reference to FIG. 9. FIG. 9 is a schematic diagram for explaining prevention of luminance unevenness in the display device according to this embodiment. The differences from Embodiment 1 will be mainly described below, while omitting or simplifying the description of the elements that are the same as or similar to those in Embodiment 1. The display device according to this embodiment differs from display device 1 according to Embodiment 1 in that WS signal gate driver **12*b*3 is included and in the input position of the control signal to the selector control line (first selector control line SELa and second selector control line SELb). The gate drivers other than the WS signal gate drivers are omitted in FIG. 9**.

As illustrated in FIG. 9, the display device according to this embodiment includes WS signal gate drivers **12*a*3 and 12*b*3 on both sides of display 11. The display device according to this embodiment supplies control signal WS from both sides of write signal line WS. Write signal line WS has respective input terminals connected to WS signal gate drivers 12*a*3 and 12*b*3, at both ends. Specifically, write signal line WS has input terminal TWa connected to WS signal gate driver 12*a*3 and input terminal TWb connected to WS signal gate driver 12*b*3**.

WS signal gate driver **12*a*3 supplies control signal WS to write signal line WS so as to transfer control signal WS in a first direction from first pixel 110*a* to second pixel 110*b*. WS signal gate driver 12*b*3 supplies control signal WS to write signal line WS so as to transfer control signal WS in a second direction from second pixel 110*b* to first pixel 110*a***.

In this way, the waveform rounding in control signal WS is similar to that in the corresponding part of the display device according to the comparative example of Embodiment 1.

WS signal gate driver **12*b*3** is an example of a fourth gate driver.

Selector control line SEL for controlling selector circuit 120 includes first selector control line SELa and second selector control line SELb. First selector control line SELa has input terminal TS1 for connecting to controller 20. Second selector control line SELb has input terminal TS2 for connecting to controller 20. Input terminals TS1 and TS2 may be, for example, located near each other. Two controllers 20 are implemented by different ICs as an example.

First selector control line SELa is connected to controller 20 at a position between both ends of the pixel row (center position in the horizontal direction), and extends from the position toward the first pixel **110*a*** side.

Second selector control line SELb is connected to controller 20 at the position between both ends of the pixel row (center position in the horizontal direction), and extends from the position toward the second pixel **110*b*** side.

The position is, for example, the center position in the pixel row, although not limited to such. For example, first selector control line SELa and second selector control line SELb are transfer paths from the center to the left and right sides in the pixel row. The transfer direction of control signal SELa in first selector control line SELa and the transfer direction of control signal SELb in second selector control line SELb are opposite directions. For example, the transfer direction of control signal WS supplied from WS signal gate driver **12*a*3 and the transfer direction of control signal SELa in first selector control line SELa are opposite directions, and the transfer direction of control signal WS supplied from WS signal gate driver 12*b*3** and the transfer direction of control signal SELb in second selector control line SELb are opposite directions.

The same control signal is input to first selector control line SELa and second selector control line SELb. A control signal for supplying data voltage Vdat_b, etc. to the same data voltage line (data voltage line to which pixels 110 emitting light of the same color are connected) from among data voltage line B_Sig, etc. is input to first selector control line SELa and second selector control line SELb.

Although it appears in FIG. 9 that neither first selector control line SELa nor second selector control line SELb is connected to data voltage line Sig2, one of first selector control line SELa and second selector control line SELb is connected to data voltage line Sig2.

[2-2. Effects, Etc.]

As described above, in the display device according to this embodiment, first selector control line SELa is connected to controller 20 at a position between both ends of the pixel row, and extends from the position toward the first pixel 110*a* side. The display device further includes WS signal gate driver 12*b*3 that supplies control signal WS to the plurality of write signal lines WS from the second pixel 110*b* side out of first pixel 110*a* and second pixel 110*b*, and second selector control line SELb that is connected to controller 20 at the position and extends from the position toward the second pixel 110*b* side.

Thus, the display device supplies control signal WS from both sides of write signal line WS, and accordingly can achieve high performance such as high-speed operation. Moreover, since control signal SEL can be supplied to selector control line SEL from between both ends of the pixel row, luminance unevenness caused by feedthrough voltage ΔVfs can be prevented as compared with the case where control signal SEL is supplied from both ends. Display device 1 can therefore achieve both high performance and prevention of non-uniformity of in-plane luminance.

The position between both ends of the pixel row is a center position in the pixel row.

Thus, control signal SEL can be input from the center position in display 11, so that first selector control line SELa and second selector control line SELb can be equal in length. That is, feedthrough voltage ΔVfs_sig that occurs in first selector control line SELa on the left side and feedthrough voltage ΔVfs_sig that occurs in second selector control line SELb on the right side can be made equal. Since display device 1 can prevent the difference in feedthrough voltage ΔVfs_sig caused by the difference in length between first selector control line SELa and second selector control line SELb, non-uniformity of in-plane luminance can be further prevented.

Embodiment 3

[3-1. Structure of Display Device]

Figure 10:
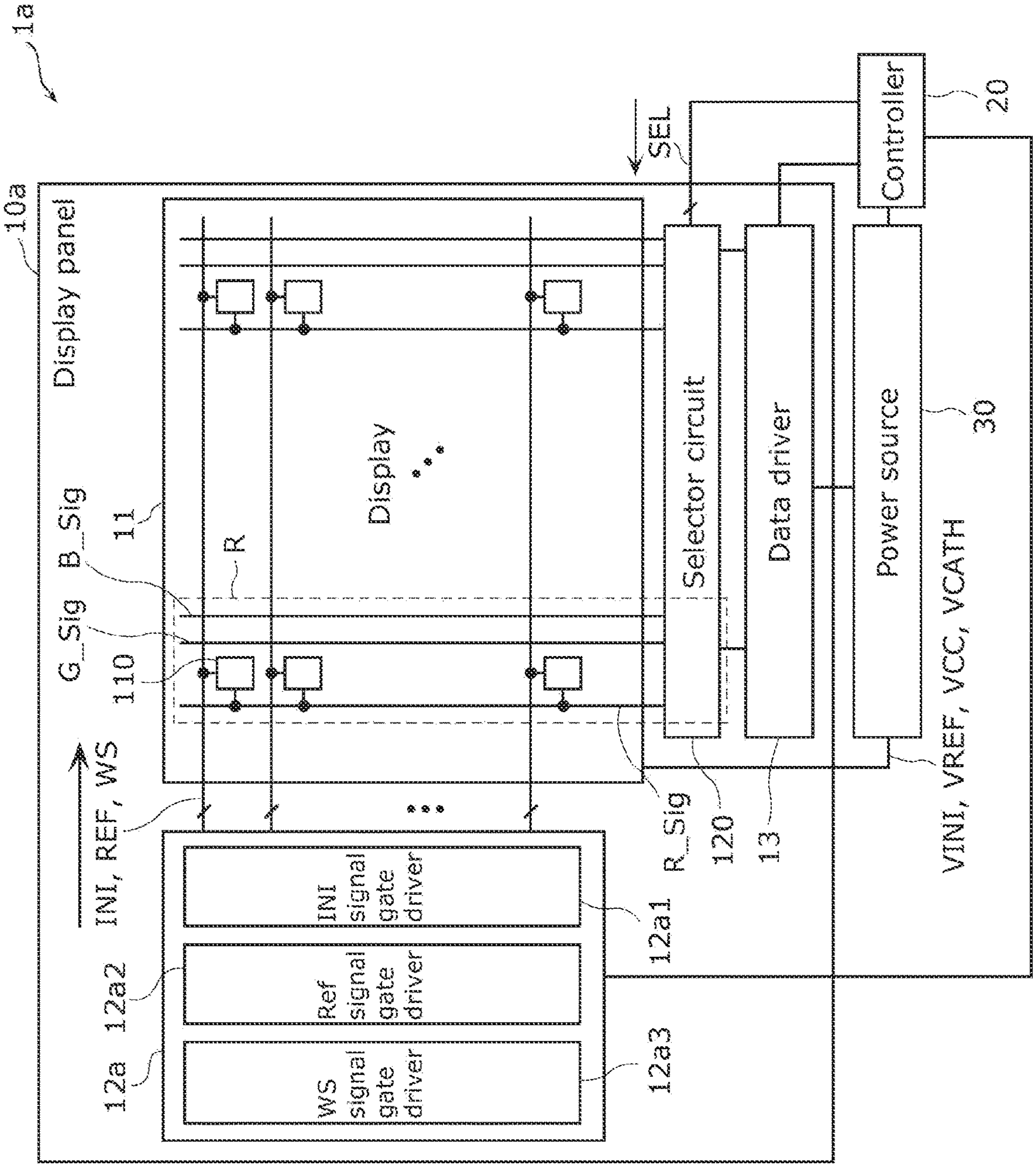
FIG. 10 is a block diagram illustrating an example of the functional structure of a display device according to Embodiment 3.

A display device according to this embodiment will be described below, with reference to FIG. 10. FIG. 10 is a block diagram illustrating an example of the functional structure of display device 1*a* according to this embodiment. The differences from Embodiment 1 will be mainly described below, while omitting or simplifying the description of the elements that are the same as or similar to those in Embodiment 1. Display device 1*a* according to this embodiment differs from display device 1 according to Embodiment 1 in that second gate driver 12*b* is not included.

As illustrated in FIG. 10, display panel 10*a* in display device 1*a* includes first gate driver 12*a* only on one side of display 11. Display device 1*a* does not include a control circuit such as a gate driver on the side (the right side of display 11 in the example in FIG. 10) opposite to first gate driver 12*a*. Display device 1*a* is located only at the end on the first pixel 110*a* side out of the first pixel 110*a* side and the second pixel 110*b* side.

WS signal gate driver 12*a*3 is an example of a first gate driver, INI signal gate driver 12*a*1 is an example of a second gate driver, and Ref signal gate driver 12*a*2 is an example of a third gate driver.

[3-2. Effects, Etc.]

As described above, each of the plurality of pixels 110 included in display device 1*a* according to this embodiment includes light-emitting element EL. Display device 1*a* further includes: drive transistor TD connected to an anode of light-emitting element EL; a plurality of initialization signal lines INI that are each located at a different pixel row in the plurality of pixels 110, and to which control signal INI for Initializing potentials of light-emitting elements $EL_B$, $EL_G$, and $EL_R$ is supplied; INI signal gate driver 12*a*1 that supplies control signal INI to the plurality of initialization signal lines INI; a plurality of reference signal lines REF that are each located at a different pixel row in the plurality of pixels 110, and to which control signal REF for supplying reference voltage VREF to a gate electrode of drive transistor TD is supplied; and Ref signal gate driver 12*a*2 that supplies control signal REF to the plurality of reference signal lines REF. WS signal gate driver 12*a*3, INI signal gate driver 12*a*1, and Ref signal gate driver 12*a*2 are located only on a side closer to first pixel 110*a*, out of the side closer to first pixel 110*a* and a side closer to second pixel 110*b*.

Thus, three gate drivers are located only on one side of display panel 10*a*. This makes it possible to reduce the layout area of drive circuitry around display 11, so that narrow-frame display device 1*a* can be provided. Since display device 1*a* has no gate driver on one side of its frame, the range of applications of display device 1*a* as a product is expected to widen.

Other Embodiments

Although the display device according to the present disclosure has been described by way of each of the foregoing embodiments, the display device according to the present disclosure is not limited to the foregoing embodiments. Other embodiments obtained by combining any structural elements in the foregoing embodiments, modifications obtained by applying various changes conceivable by a person skilled in the art to the foregoing embodiments without departing from the scope of the present disclosure, and various appliances including any of the display devices according to the embodiments are also included in the present disclosure.

Figure 11:
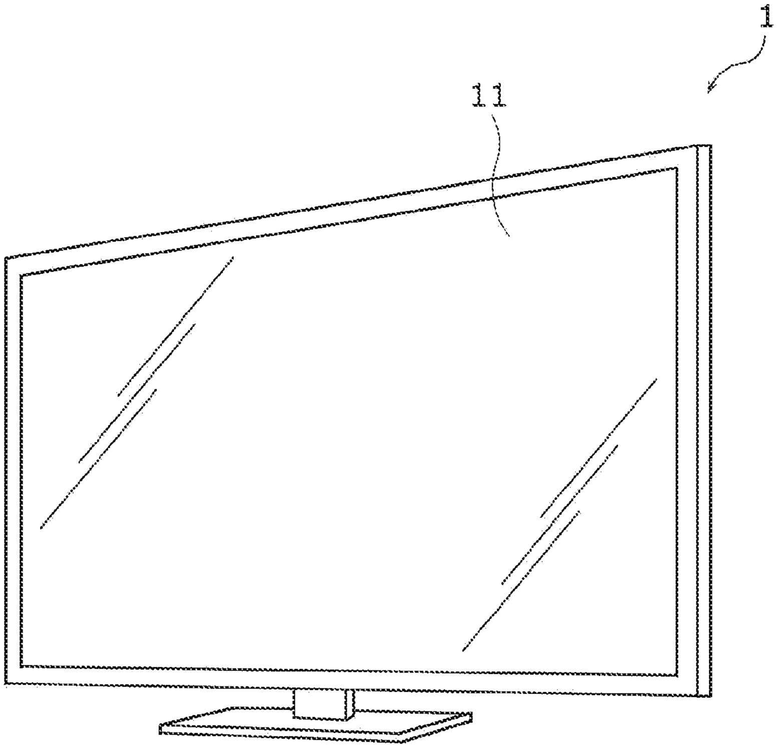
FIG. 11 is a perspective diagram illustrating the appearance of the display device according to each embodiment.

For example, display device 1 according to the present disclosure may be implemented as a flat display device as illustrated in FIG. 11. FIG. 11 is a perspective diagram illustrating the appearance of display device 1 according to Embodiment 1. Such display device 1 can prevent luminance unevenness in display 11. The display device according to Embodiment 2 and display device 1*a* according to Embodiment 3 may each be equally implemented as such a flat display device. The display device according to the present disclosure is not limited to any particular use. The display device may be used in portable information terminals, personal computers, televisions, digital signage, and so on.

Although the foregoing embodiments each describe an example in which the light-emitting elements included in the display device are organic EL elements, the light-emitting elements are not limited to such. The light-emitting elements may be any other type of self light-emitting elements. For example, the light-emitting elements may be light-emitting elements using quantum-dot light-emitting diodes (QLEDs).

Although the foregoing embodiments each describe an example in which each pixel circuit includes a single-gate write transistor, the pixel circuit is not limited to such, and may include a double-gate write transistor. In such a case, for example, a first WS signal gate driver supplies, in a first direction, a control signal to a write signal line to which one write transistor of the double-gate write transistor is connected, and a second WS signal gate driver supplies, in a second direction opposite to the first direction, a control signal to a write signal line to which the other write transistor of the double-gate write transistor is connected. The display device may not include a selector circuit in this case.

Amplitudes ΔVsel and ΔVws in each of the foregoing embodiments may be the same. That is, the potential difference between low level and high level in a first gate control signal and the potential difference between low level and high level in a selector control signal may be equal.

Each of the structural elements such as the first gate driver, the second gate driver, the data driver, and the controller in each of the foregoing embodiments may be configured in the form of an exclusive hardware product, or may be realized by executing a software program suitable for the structural element. Each of the structural elements may be realized by means of a program executing unit, such as a CPU or a processor, reading and executing the software program recorded on a recording medium such as a hard disk or a semiconductor memory. The processor includes one or more electronic circuits including semiconductor integrated circuit (IC) or large scale integration (LSI). The IC may be directly mounted on a TFT substrate of a display panel by chip-on-glass (COG) technology, or mounted on a flexible wiring substrate such as a flexible flat cable (FFC) or a flexible printed cable (FPC) by chip-on-film (COF) technology.

The first gate driver in each of the foregoing embodiments may be implemented by one IC, or the WS signal gate driver, the Ref signal gate driver, and the INI signal gate driver may each be implemented by a different IC.

The second gate driver in each of Embodiments 1 and 3 may be implemented by one IC, or the Ref signal gate driver and the INI signal gate driver may each be implemented by a different IC.

The second gate driver in Embodiment 2 may be implemented by one IC, or the WS signal gate driver, the Ref signal gate driver, and the INI signal gate driver may each be implemented by a different IC.

The display device in Embodiment 2 may have a structure in which only the WS signal gate driver is located on both sides of the display and the Ref signal gate driver and the INI signal gate driver are located on one side of the display.

The controller and the data driver in each of the foregoing embodiments may be implemented by one IC, or may each be implemented by a different IC.

In each of the foregoing embodiments, for example, initialization transistors $T\mathbf{1}_G$ and $T\mathbf{1}_B$ may have the same function and structure as initialization transistor $T\mathbf{1}_R$, compensation transistors $T\mathbf{2}_G$ and $T\mathbf{2}_B$ may have the same function and structure as compensation transistor $T\mathbf{2}_R$, write transistors $T\mathbf{3}_G$ and $T\mathbf{3}_B$ may have the same function and structure as write transistor $T\mathbf{3}_R$, and drive transistors $TD_G$ and $TD_B$ may have the same function and structure as drive transistor $TD_R$.

In each of the foregoing embodiments, for example, light-emitting elements $EL_G$ and $EL_B$ may have the same function and structure as light-emitting element $EL_R$.

In each of the foregoing embodiments, for example, holding capacitors $CS_G$ and $CS_B$ may have the same function and structure as holding capacitor $CS_R$.

Although the foregoing embodiments each describe an example in which the display device displays color images, the display device is not limited to such, and may display, for example, monochrome images.

In each of the foregoing embodiments, for example, the write signal lines and the selector control lines may be parallel to the pixel rows.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The presently disclosed techniques are useful, for example, for display devices including organic EL elements.

The invention claimed is:

1. A display device, comprising:

a plurality of pixels arranged in a matrix;

a plurality of first gate control lines that are each located at a different pixel row in the matrix of the plurality of pixels, and to which a first gate control signal is supplied, the first gate control signal being for selecting a pixel row to which a data voltage corresponding to image data is to be written;

a first gate driver that supplies the first gate control signal to the plurality of first gate control lines;

a plurality of data voltage lines that are each located at a different pixel column in the matrix of the plurality of pixels, and used to write the data voltage corresponding to the image data;

a data driver that supplies the data voltage to the plurality of data voltage lines;

a selector circuit that is connected between the data driver and the plurality of data voltage lines, and switches a data voltage line to which the data voltage from the data driver is supplied among the plurality of data voltage lines;

a first selector control line to which a selector control signal for controlling the selector circuit is supplied; and a controller that supplies the selector control signal to the first selector control line, wherein the plurality of pixels includes a first pixel and a second pixel that belong to a same pixel row, the first gate driver supplies the first gate control signal to the plurality of first gate control lines to transfer the first gate control signal in a first direction from the first pixel to the second pixel, the controller supplies the selector control signal to the first selector control line to transfer the selector control signal in a second direction from the second pixel to the first pixel, each pixel column includes a first subpixel column including only a first subpixel that emits light of a first emission color, and a second subpixel column including only a second subpixel that emits light of a second emission color that is different from the first emission color, the second subpixel column being located side-by-side with the first subpixel column, the selector circuit is located, for each pixel column, between the pixel column and the data driver, and includes a switch portion that switches between a first data voltage line to which the first subpixel column is connected and a second data voltage line to which the second subpixel column is connected, the first selector control line is connected to the controller at a position between both ends of the pixel row, and extends only from the position toward a first side closer to the first pixel, and the display device further comprises:

a fourth gate driver that supplies the first gate control signal to the plurality of first gate control lines to transfer the first gate control signal in the second direction; and a second selector control line that is connected to the controller at the position, and extends only from the position toward a second side closer to the second pixel.

2. The display device according to claim 1, wherein the first gate driver is connected to, out of respective ends of each of the plurality of first gate control lines on a first pixel side and a second pixel side, only a first end on the first pixel side, the first pixel side being closer to the first pixel, the second pixel side being closer to the second pixel, and the controller is connected to, out of respective ends of the first selector control line on the first pixel side and the second pixel side, only a first end on the second pixel side.

3. The display device according to claim 2, wherein a second end of each of the plurality of first gate control lines on the second pixel side is not connected to an other gate driver, and a second end of the first selector control line on the first pixel side is not connected to an other controller.

4. The display device according to claim 1, wherein the plurality of pixels each include a light-emitting element, the display device further comprises:

a drive transistor connected to an anode of the light-emitting element;

a plurality of second gate control lines that are each located at a different pixel row in the matrix of the plurality of pixels, and to which a second gate control signal for initializing a potential of the light-emitting element is supplied;

a second gate driver that supplies the second gate control signal to the plurality of second gate control lines;

a plurality of third gate control lines that are each located at a different pixel row in the matrix of the plurality of pixels, and to which a third gate control signal for supplying a reference voltage to a gate electrode of the drive transistor is supplied; and a third gate driver that supplies the third gate control signal to the plurality of third gate control lines, and the first gate driver, the second gate driver, and the third gate driver are located only on a first side closer to the first pixel, out of the first side closer to the first pixel and a second side closer to the second pixel.

5. The display device according to claim 4, wherein the light-emitting element is an organic electroluminescent (EL) element.

6. The display device according to claim 1, wherein the position is a center position in the pixel row.

7. The display device according to claim 1, wherein, after the data voltage is supplied to the plurality of data voltage lines, the first gate control signal and the selector control signal are supplied such that the data voltage is written into a pixel of a pixel row selected, with the plurality of data voltage lines being in a floating state.

* * * * *